(12) United States Patent
Ueno et al.

(10) Patent No.: US 8,354,515 B2
(45) Date of Patent: Jan. 15, 2013

(54) OLIGONUCLEOTIDE DERIVATIVE, LABELING AGENT AND USE FOR LABELING AGENT

(75) Inventors: Yoshihito Ueno, Gifu (JP); Yukio Kitade, Gifu (JP)

(73) Assignee: Japan Science and Technology Agency, Kawaguchi-Shi (JP)

( * ) Notice: Subject to any disclaimer, the term of this patent is extended or adjusted under 35 U.S.C. 154(b) by 0 days.

(21) Appl. No.: 13/126,320

(22) PCT Filed: Nov. 2, 2009

(86) PCT No.: PCT/JP2009/068785
§ 371 (c)(1),
(2), (4) Date: Jun. 23, 2011

(87) PCT Pub. No.: WO2010/055789
PCT Pub. Date: May 20, 2010

(65) Prior Publication Data
US 2012/0126175 A1    May 24, 2012

(30) Foreign Application Priority Data
Nov. 14, 2008  (JP) .................................. 2008-292815

(51) Int. Cl.
 C07H 21/02 (2006.01)
 C07H 21/00 (2006.01)
 C07H 21/04 (2006.01)
 C07H 19/04 (2006.01)
 C12Q 1/68 (2006.01)
(52) U.S. Cl. ...................... 536/23.1; 536/24.3; 536/25.3; 536/26.6; 435/6.1
(58) Field of Classification Search ................ 536/23.1, 536/24.3, 25.3, 26.6; 435/6.1
See application file for complete search history.

(56) References Cited

U.S. PATENT DOCUMENTS

| 7,323,555 B2 | 1/2008 | Saito et al. |
| 7,414,117 B2 | 8/2008 | Saito et al. |

FOREIGN PATENT DOCUMENTS

| JP | A-2007-215477 | 8/2007 |
| WO | WO 2005/085269 A1 | 9/2005 |

(Continued)

OTHER PUBLICATIONS

Written Opinion of the International Searching Authority in International Application No. PCT/JP2009/068785; dated Dec. 28, 2009 (with partial English-language translation).

(Continued)

*Primary Examiner* — Jezia Riley
(74) *Attorney, Agent, or Firm* — Oliff & Berridge, PLC

(57) ABSTRACT

A labeling agent comprising a plurality of nucleotide derivative units represented by Formula (1) below:

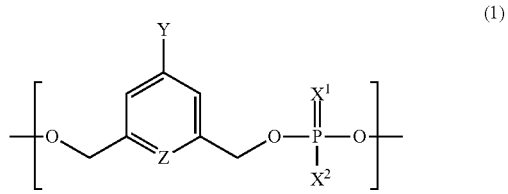

(where, Z represents a nitrogen atom or CH, Y represents an uncondensed aromatic hydrocarbon group or condensed polycyclic hydrocarbon group, $X^1$ represents O, S or Se, and $X^2$ represents SH (or $S^-$), $Se^-$, a $C_{1-4}$ alkyl or a morpholino group).

12 Claims, 28 Drawing Sheets

FOREIGN PATENT DOCUMENTS

| | | |
|---|---|---|
| WO | WO 2006/027862 A1 | 3/2006 |
| WO | WO 2007/094135 A1 | 8/2007 |

OTHER PUBLICATIONS

Ueno et al., "Synthesis of nuclease-resistant siRNAs possessing benzene-phosphate backbones in their 3'-overhang regions," *Bioorganic & Medicinal Chemistry Letters*, 2008, vol. 18, pp. 5194-5196.

Ueno et al., "Synthesis and Properties of Nucleic Acid Analogues Consisting of a Benzene-Phosphate Backbone," *J. Org. Chem.*, 2005, vol. 70, pp. 7925-7935.

Ueno et al., "Synthesis and properties of DNA analogs consisting of the benzene-phosphate backbone," *Nucleic Acids Symposium Series*, 2004, No. 48, pp. 17-18.

Wilson et al., Efficient Quenching of Oligomeric Fluorophores on a DNA Backbone, *J. Am. Chem. Soc.*, 2007, vol. 129, pp. 15426-15427.

Gao et al., "Modified DNA Analogues That Sense Light Exposure with Color Changes," *J. Am. Chem. Soc.*, 2004, vol. 126, pp. 12748-12749.

Gao et al., "Libraries of Composite Polyfluors Built from Fluorescent Deoxyribosides," *J. Am. Chem. Soc.*, 2002, vol. 124, pp. 11590-11591.

Komatsuzaki et al., "Benzene-rin-san Kokkaku kara Naru Keiko Shikiso Shusekitai no Gosei to Sheishitsu (1)," Dai 89 Annual Meeting of Chemical Society of Japan in Spring Koen Yokoehu, 2009, No. 2, p. 1283 (3 H6-51).

Takasu et al., "Benzene-rin-san Kokkaku kara Naru Keiko Shikiso Shusekitai no Gosei to Sheishitsu (I)," Dai 89 Annual Meeting of Chemical Society of Japan in Spring Koen Yokoshu, 2009, No. 2, p. 1283 (3 H6-52).

International Search Report in International Application No. PCT/JP2009/068785; dated Dec. 28, 2009 (with English-language translation).

EX.256nm
EM.256.8nm
Fluorescence Intensity : 14.9

EX.256nm
EM.317.6nm
Fluorescence Intensity : 150.0

EX.290nm
EM.292.4nm
Fluorescence Intensity : 7.4

EX.290nm
EM.346.0nm
Fluorescence Intensity : 311.3

| EX.304nm | EX.304nm | EX.344nm | EX.344nm |
| EM.305.6nm | EM.372.2nm | EM.377.6nm | EM.379.6nm |
| Fluorescence Intensity: 3.1 | Fluorescence Intensity: 110.2 | Fluorescence Intensity: 19.1 | Fluorescence Intensity: 206.8 | bu-1: 3'-AGCTCGGTCATCGAGAGTGCA-5'
bu-2: 3'-TGCACTCTCGATGACCGAGCT-5'
bu-3: 3'-AGCTCGGTCAPy$^B$CGAGAGTGCA-5'
bu-4: 3'-TGCACTCTCGPy$^B$TGACCGAGCT-5'
bu-5: 3'-AGCTCGGTCPy$^B$Py$^B$CGAGAGTGCA-5'
bu-6: 3'-TGCACTCTCGPy$^B$Py$^B$GACCGAGCT-5'
bu-7: 3'-AGCTCGGTPy$^B$Py$^B$Py$^B$CGAGAGTGCA-5'
bu-8: 3'-TGCACTCTCGPy$^B$Py$^B$Py$^B$ACCGAGCT-5'

Py$^B$

| name | calculated | observed |
|---|---|---|
| bu-1 | 6468.1 | 6468.5 |
| bu-2 | 6379.1 | 6381.8 |
| bu-3 | 6564.2 | 6563.8 |
| bu-4 | 6466.1 | 6467.4 |
| bu-5 | 6651.2 | 6653.2 |
| bu-6 | 6562.2 | 6566.7 |
| bu-7 | 6762.2 | 6764.1 |
| bu-8 | 6633.2 | 6634.2 |

Fig.9

Absorption Spectra of Oligonucleotides bu-3 : bu-4
bu-3: 3'- AGCTCGGTCAPy$^B$CGAGAGTGCA -5'
bu-4: 3'- TGCACTCTCGPy$^B$TGACCGAGCT -5' bu-5 : bu-6
bu-5: 3'- AGCTCGGTCPy$^B$Py$^B$CGAGAGTGCA -5'
bu-6: 3'- TGCACTCTCGPy$^B$Py$^B$GACCGAGCT -5 bu-7 : bu-8
bu-7: 3'- AGCTCGGTPy$^B$Py$^B$Py$^B$CGAGAGTGCA -5'
bu-8: 3'- TGCACTCTCGPy$^B$Py$^B$Py$^B$ACCGAGCT -5' bu-5 : bu-6
bu-5: 3'- AGCTCGGTCPy$^B$Py$^B$CGAGAGTGCA -5'
bu-6: 3'- TGCACTCTCGPy$^B$Py$^B$GACCGAGCT -5 bu-7 : bu-8
bu-7: 3'- AGCTCGGTPy$^B$Py$^B$Py$^B$CGAGAGTGCA -5'
bu-8: 3'- TGCACTCTCGPy$^B$Py$^B$Py$^B$ACCGAGCT -5'

| name | $T_m$ (°C) | $\Delta T_m$ | $\Delta T_m$ per modification |
|---|---|---|---|
| bu-1 : bu-2 | 67.37 | — | — |
| bu-3 : bu-4 | 75.59 | 8.22 | 8.22 |
| bu-5 : bu-6 | 78.58 | 11.21 | 2.99 |
| bu-7 : bu-8 | 78.36 | 10.99 | -0.22 |

Y: Pyrene

Oligonucleotide Derivative

E: Peryrene

Linker

| sample | Mol.wt. calculated. | Mol.wt. obserbed |
|---|---|---|
| YSSS | 3986.7 | 3988.2 |
| YYSSS | 4386.8 | 4387.2 |
| YYYSSS | 4786.9 | 4787.2 |
| ESSS | 4036.7 | 4038.3 |
| EESSS | 4486.8 | 4488.7 |
| EEESSS | 4936.9 | 4939.0 |
| EYSSS | 4436.8 | 4439.9 |
| ESYSS | 4436.8 | 4439.2 |
| ESSSY | 4436.8 | 4437.4 |
| EEYYSSS | 5287.0 | 5287.6 |
| EYEYSSS | 5287.0 | 5286.9 |

MB1  PPS-5'-GCAAGCGAAGGTCAAGGTATCTCTGCTTGC-3'-Dab
MB3  EPS-5'-GCAAGCGAAGGTCAAGGTATCTCTGCTTGC-3'-BHQ
MB4  EEPPS-5'-GCAAGCGAAGGTCAAGGTATCTCTGCTTGC-3'-BHQ

Target (CYP2C9)
RNA1 (mismatch)
3'-r(ACCCCUCUUCCAGUUACAUAGAGACCUGGAG)-5'

RNA2 (full match)
3'-r(ACCCCUCUUCCAGUUCCAUAGAGACCUGGAG)-5' dTdT    Passenger strand
    5'-r(UUUCACUACUCCUACGAGC)dTdT-3'
3'-dTdTr(AAAGUGAUGAGGAUGCUCG)-5'
          Guide strand BN
    5'-Nr(UUUCACUACUCCUACGAGC)BB-3'
3'-BNr(AAAGUGAUGAGGAUGCUCG)-5'

NN
    5'-Nr(UUUCACUACUCCUACGAGC)BB-3'
3'-NNr(AAAGUGAUGAGGAUGCUCG)-5'

(2a)

(2b)

(2c)

(2d)

(2e)

(2f)

(2g)

SEQUENCE LISTING

```
<160> NUMBER OF SEQ ID NOS: 8

<210> SEQ ID NO 1
<211> LENGTH: 21
<212> TYPE: DNA
<213> ORGANISM: Artificial sequence
<220> FEATURE:
<223> OTHER INFORMATION: synthetic construct-probe

<400> SEQUENCE: 1
acgtgagagc tactggctcg a                                             21

<210> SEQ ID NO 2
<211> LENGTH: 21
<212> TYPE: DNA
<213> ORGANISM: Artificial sequence
<220> FEATURE:
<223> OTHER INFORMATION: synthetic construct-probe

<400> SEQUENCE: 2
tcgagccagt agctctcacg t                                             21

<210> SEQ ID NO 3
<211> LENGTH: 21
<212> TYPE: DNA
<213> ORGANISM: Artificial sequence
<220> FEATURE:
<223> OTHER INFORMATION: synthetic construct-probe
<220> FEATURE:
<221> NAME/KEY: misc_feature
<222> LOCATION: (11)..(11)
<223> OTHER INFORMATION: Pyrene nucleotide analog

<400> SEQUENCE: 3
acgtgagagc nactggctcg a                                             21

<210> SEQ ID NO 4
<211> LENGTH: 21
```

```
<212> TYPE: DNA
<213> ORGANISM: Artificial sequence
<220> FEATURE:
<223> OTHER INFORMATION: synthetic construct-probe
<220> FEATURE:
<221> NAME/KEY: misc_feature
<222> LOCATION: (11)..(11)
<223> OTHER INFORMATION: Pyrene nucleotide analog

<400> SEQUENCE: 4
tcgagccagt ngctctcacg t                                              21

<210> SEQ ID NO 5
<211> LENGTH: 21
<212> TYPE: DNA
<213> ORGANISM: Artificial sequence
<220> FEATURE:
<223> OTHER INFORMATION: synthetic construct-probe
<220> FEATURE:
<221> NAME/KEY: misc_feature
<222> LOCATION: (11)..(12)
<223> OTHER INFORMATION: Pyrene nucleotide analog

<400> SEQUENCE: 5
acgtgagagc nnctggctcg a                                              21

<210> SEQ ID NO 6
<211> LENGTH: 21
<212> TYPE: DNA
<213> ORGANISM: Artificial sequence
<220> FEATURE:
<223> OTHER INFORMATION: synthetic construct-probe
<220> FEATURE:
<221> NAME/KEY: misc_feature
<222> LOCATION: (10)..(11)
<223> OTHER INFORMATION: Pyrene nucleotide analog

<400> SEQUENCE: 6
tcgagccagn ngctctcacg t                                              21

<210> SEQ ID NO 7
<211> LENGTH: 21
<212> TYPE: DNA
<213> ORGANISM: Artificial sequence
<220> FEATURE:
<223> OTHER INFORMATION: synthetic construct-probe
<220> FEATURE:
<221> NAME/KEY: misc_feature
<222> LOCATION: (11)..(13)
<223> OTHER INFORMATION: Pyrene nucleotide analog

<400> SEQUENCE: 7
acgtgagagc nnntggctcg a                                              21

<210> SEQ ID NO 8
<211> LENGTH: 21
<212> TYPE: DNA
<213> ORGANISM: Artificial sequence
<220> FEATURE:
<223> OTHER INFORMATION: synthetic construct-probe
<220> FEATURE:
<221> NAME/KEY: misc_feature
<222> LOCATION: (9)..(11)
<223> OTHER INFORMATION: Pyrene nucleotide analog

<400> SEQUENCE: 8
tcgagccann ngctctcacg t                                              21
```

OLIGONUCLEOTIDE DERIVATIVE, LABELING AGENT AND USE FOR LABELING AGENT

TECHNICAL FIELD

The present invention relates to an oligonucleotide derivative, and to a labeling agent and use thereof.

BACKGROUND ART

Oligonucleotides are known that are substituted at the base moiety with fluorescent dyes such as pyrene and perylene (Non-patent Document 1). These oligonucleotides can be seen as clusters of fluorescent dyes since the fluorescent dyes are arranged along the nucleotide backbone. It is known that when an oligomer having a sequence of multiple fluorescent dyes of the same or different kinds is excited at a single excitation wavelength, fluorescence may be emitted in wavelength bands longer than those of the constituent monomers, or the fluorescence wavelength may vary depending on the sequence of fluorescent dyes. Therefore, it is thought that different detection targets can be detected by their different fluorescent color emissions at a single excitation wavelength by using multiple clusters with difference fluorescent dye sequences as fluorescent labels.

Non-patent Document 1: Kool et al., J.A.C.S. 129, 15426 (2007)

SUMMARY OF THE INVENTION

Technical Problem

However, the clusters described in Non-patent Document 1 have pyrene and other fluorescent dyes bound to carbon atoms of ribose on the nucleotide, and have been difficult to synthesize efficiently. It has also been difficult to increase the fluorescent wavelengths or in other words to increase the diversity of wavelengths that are detected. Moreover, the clustered state of the fluorescent dyes is unstable, and it has been difficult to increase the fluorescent strength. At present, no cluster of fluorescent dyes has been discovered that fulfills these requirements.

Moreover, there is also a demand for oligonucleotide derivatives that are more stable in vivo. For example, there is a demand for oligonucleotide derivatives with enhanced nuclease resistance.

It is therefore an object of the present invention to provide an oligonucleotide derivative suited to practical use, as well as a fluorescent dye cluster and use therefor.

Solution to Technical Problem

From attempts to array fluorescent dyes along benzene-phosphate backbones developed by the inventors in the past, the inventors in this case discovered that by linking fluorescent dyes to the benzene carbon atoms in the backbone, it is possible to cluster (stack) the dyes effectively and form stable excimers and/or exciplexes. They also discovered that nuclease resistance was improved by providing such nucleotide derivative units. The inventors perfected the present invention based on these discoveries. The followings are provided by the Specification.

The disclosures of the Specification provide a labeling agent comprising a plurality of nucleotide derivative units represented by Formula (1) below:

[C1]

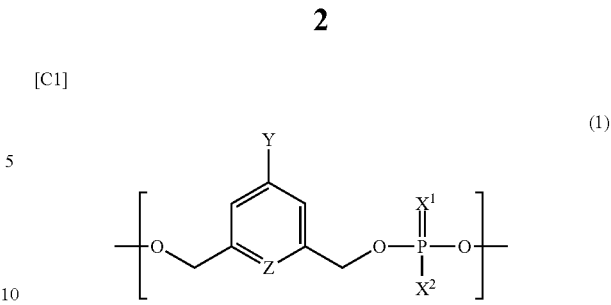

(where, Z represents a nitrogen atom or CH, Y represents an uncondensed aromatic hydrocarbon group or condensed polycyclic hydrocarbon group, $X^1$ represents O, S or Se, and $X^2$ represents SH (or $S^-$), $Se^-$, a $C_{1-4}$ alkyl or a morpholino group).

In the labeling agent disclosed in the Specification, Y above is preferably a condensed polycyclic hydrocarbon group, or else Y is preferably selected from the group consisting of naphthalene, phenanthrene, pyrene and perylene. The plurality of nucleotide derivative units may be provided in a continuous series, or the plurality of nucleotide units may be provided, with linker units inbetween. Moreover, the plurality of the nucleotide derivative units may be two nucleotide derivative units in which Y above may be the same or different, and which may be provided in a continuous series.

The disclosures of the Specification provide a set of labeling agents comprising two or more labeling agents each provided with a plurality of nucleotide derivative units represented by Formula (1) above, in which the sequence of the aforementioned Y in the plurality of nucleotide derivative units is different for each labeling agent. The set of labeling agents disclosed in the Specification may also comprise a labeling agent having one nucleotide derivative unit represented by Formula (1) above.

The disclosures of the Specification provide an oligonucleotide derivative provided with a plurality of nucleotide derivative units each represented by Formula (1) above. The plurality of nucleotide derivative units may provided at the 3' terminal end or 5' terminal end.

The disclosures of the Specification provide an oligonucleotide probe set comprising two or more oligonucleotide probes each provided with a plurality of nucleotide derivative units each represented by Formula (1) above, wherein the sequence of the aforementioned Y in the plurality of nucleotide derivative units is different for each probe. A labeling agent having one nucleotide derivative unit represented by Formula (1) above may also be included.

The disclosures of the Specification provide an RNA interference agent having a plurality of nucleotide derivative units represented by Formula (1).

BRIEF DESCRIPTION OF DRAWINGS

FIG. 9 is a table showing the molecular weight measurement results from MALDI-TOF/MS of the oligonucleotide synthesized in Example 7.

DESCRIPTION OF EMBODIMENTS

Figure 1:
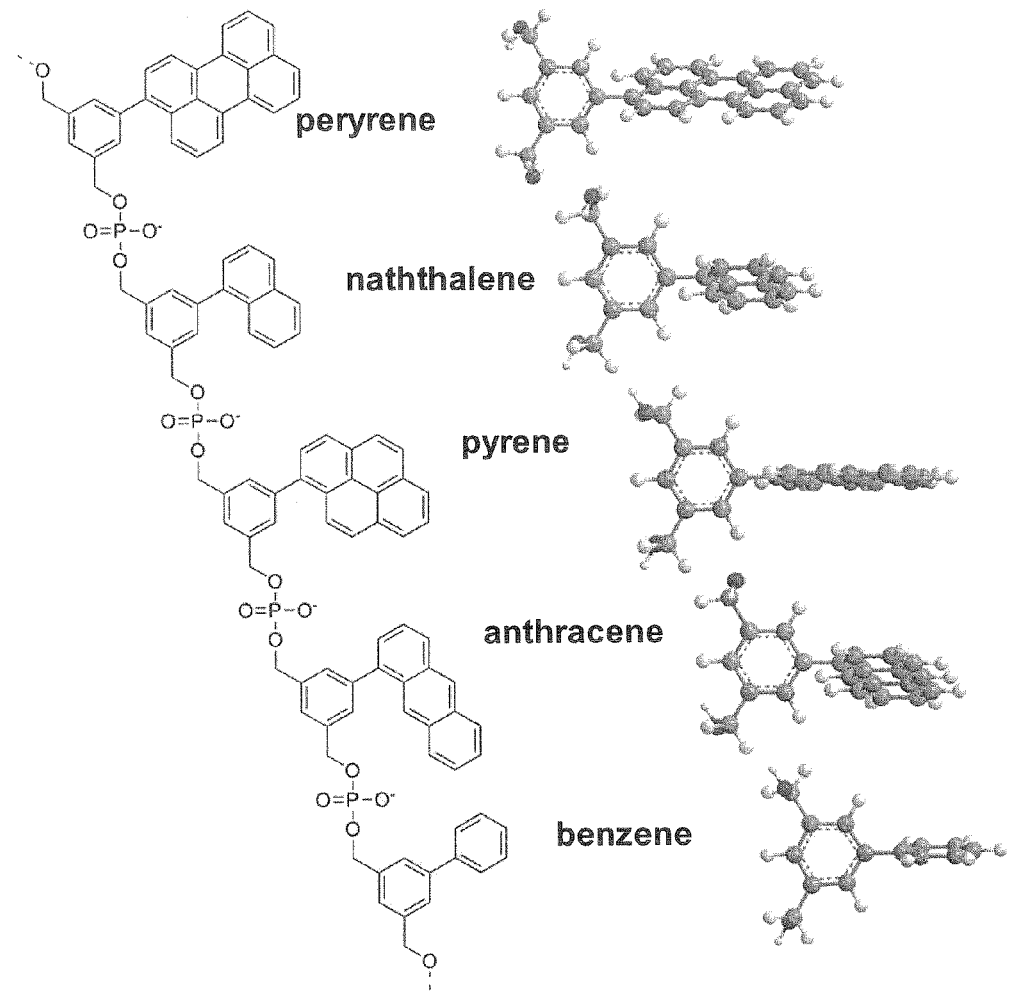
FIG. 1 shows one mode of the labeling agent disclosed in the Specification.

The disclosures of the Specification relate to a labeling agent having multiple nucleotide derivative units each represented by Formula (1) above, and to a use therefor. One mode of the labeling agent disclosed in the Specification is shown in FIG. 1.

With the labeling agent disclosed in the Specification, stable fluorescent color emission, enhanced fluorescent strength and a shift toward longer fluorescence wavelengths are easily achieved because the fluorescent dyes can be stacked effectively. Because it can be used to label oligonucleotides and the like, moreover, the labeling agent disclosed in the Specification provides an oligonucleotide probe, RNA hybridization reagent and RNA interference agent having the same effects. It also provides a method for detecting oligonucleotides and the like using these reagents and the like.

The labeling agent that is an embodiment of the present invention is explained in detail below together with a set thereof, an oligonucleotide derivative, an oligonucleotide probe and set thereof, an RNA hybridization reagent and RNA interference agent, and uses for these. Conventional techniques of molecular biology and nucleic acid chemistry associated with the present invention that are familiar to those skilled in the art are explained in the literature. For instance, one can consult Sambrook et al., Molecular Cloning: A Laboratory Manual, Cold Spring Harbor Laboratory, Cold Spring Harbor, N.Y., 1989; Gait, M. J., Ed., Oligonucleotide Synthesis (1984); Hames, B. D. and Higgins, S. J., Eds., Nucleic Acid Hybridization (1984); and the series Methods in Enzymology, Academic Press, Inc.

(Labeling Agent and Set Thereof)

The labeling agent of the present invention is the compound represented by Formula (1). In the compound, Z represents a carbon atom (CH) or nitrogen atom. A hydrogen atom in the ring containing Z in Formula (1) may alternatively be substituted.

Y represents an uncondensed aromatic hydrocarbon group or condensed polycyclic hydrocarbon group. Examples of uncondensed aromatic hydrocarbon groups include monocyclic unsaturated organic substituents with aromatic properties. These include aromatic hydrocarbon groups for example, and substituents containing benzene are typical. It may alternatively be a monocyclic heterocyclic substituent. Any of the carbon atoms on the aromatic monocycle of such a monocyclic unsaturated organic substituent is linked to a carbon atom on the benzene ring in Formula (1). The carbon atoms on the monocycle of this substituent may also be substituted. The substituents are not particularly limited, but are preferably those that do not diminish the stability of the stack or lower the fluorescent strength.

A cyclic compound in the condensed polycyclic hydrocarbon group may be an aromatic or non-aromatic compound, but is preferably an aromatic compound. Examples of condensed polycyclic hydrocarbon groups include naphthalene, azulene, heptalene, biphenylene, phenanthrene, anthracene, triphenylene, pyrene, chrysene, tetracene, picene, perylene, pentaphen, pentacene and the like. Of these, a substituent of a condensed aromatic compound selected from naphthalene, phenanthrene, pyrene and perylene is preferred. These are easily obtainable, and are useful for forming a stable stack. The hydrogen atoms in the condensed polycyclic hydrocarbon group may also be substituted. Any carbon atom on a condensed ring of the condensed polycyclic hydrocarbon group is linked to a carbon atom on the benzene ring represented by Formula (1).

Both uncondensed aromatic hydrocarbon groups and condensed polycyclic hydrocarbon groups may include known fluorescent dyes. Examples include fluorescein dyes, rhodamine dyes, Alexa dyes and the like.

In Formula (1), $X^1$ represents O, S or Se, and $X^2$ represents SH (or $S^-$), $Se^-$, or a $C_{1-4}$ alkyl or morpholino group. The various groups represented by Formula (2) below are examples of such phosphodiester groups.

[C2]

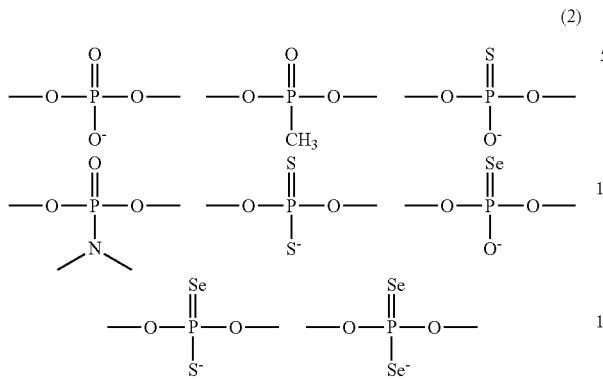

(2)

The labeling agent of the present invention is provided with a plurality of the aforementioned nucleotide derivative units. The number of nucleotide derivative units in the labeling agent of the present invention, the type of substituents Y included, and the sequence of substituents Y are determined by the desired fluorescence wavelength, the excitation wavelength used and the like. Matters to consider include the fact that the greater the number of nucleotide derivatives, the more the fluorescence wavelength tends to shift towards longer wavelengths, and the desirability of using a wavelength that excites at least one of the multiple substituents P for the excitation wavelength. The number of nucleotide derivative units on the labeling agent depends on the combination thereof, but a combination of at least 2 but no more than 10 is desirable. At least 2 but no more than 5 is more desirable.

The fluorescence wavelength differs depending on the distance between adjacent stacked substituents Y. If the distance is too greater, stack formation becomes difficult, the fluorescent strength is not be increased, and the shift of fluorescence wavelength to longer wavelengths does not occur. The sequences of the various synthetic dyes can be designed and synthesized either comprehensively or within a certain range, and exposed to excitation light at a single wavelength to determine the fluorescence wavelengths of each labeling agent that is synthesized.

Multiple nucleotide derivative units can be provided in a continuous series along the framework represented in the Formula (1). By providing them continuously it is possible to shorten the distance between substituents Y so that substituents Y can be effectively stacked, thereby promoting enhanced fluorescent strength and a shift towards longer wavelengths. However, the multiple nucleotide derivative units can be provided with linker units in between. Providing linker units in between the multiple nucleotide derivative units makes it possible to adjust the stacking distance between substituents Y, to supply negative charge via phosphoric acid groups and the like, to adjust the degree of fluorescence wavelength shift and the degree of fluorescent strength enhancement, and to produce a variety of fluorescent color emissions. The linker unit is preferably a unit that is at least capable of phosphodiester bonding in Formula (1) above, and does not include substituent Y or a nucleic acid base or the like that replaces it. A typical example is a unit represented by Formula (3) below. In Formula (3), —$X^1$ represents O, S or Se, —$X^2$ represents SH (or $S^-$), $Se^-$, or a $C_{1-4}$ alkyl or morpholino group. R represents a roughly $C_{2-5}$ alkylene chain, or preferably a $C_{3-4}$ alkylene chain. The alkylene chain may be substituted with a roughly $C_{1-5}$ lower alkyl group, hydroxyl group, halogen atom or the like to the extent that this does not detract from the stacking effect of substituents Y.

[C3]

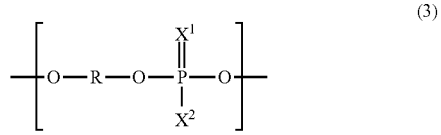

(3)

When the multiple nucleotide derivative units are provided with at least one linker unit in between, the number of linker units intervening between nucleotide derivative units is preferably 4 or less. This is because it is difficult to obtain a stacking effect with 5 or more linkers. Preferably the number is 3 or less.

In the multiple nucleotide derivative units, the substituents Y in adjacent nucleotide derivative units may be of the same kind or of different kinds. When they are the same, an excimer is formed by stacking, while when they are different an exciconplex can be formed.

The linker units can also function as linking sites where the nucleotide derivative units are linked to the compound to be labeled. The linker unit represented by Formula (3) above can be used favorably for linking to an oligonucleotide. The labeling agent can also be provided as necessary with the necessary linking groups according to the type of compound to be labeled. When binding to a protein for example, linking groups capable of covalent binding with the amino groups, carboxyl groups, SH groups and the like of the protein can be provided.

With the labeling agent disclosed in the Specification, substituents Y can be effectively stacked because of the benzene ring-phosphate backbone, and because Y is bound directly to the benzene ring. That is, a strong stack can be obtained more easily than when substituent Y is bound to the ribose ring as it is conventionally. As a result, the fluorescence wavelength can be shifted to longer wavelengths than those of the fluorescent dye cluster described in Non-patent Document 1, and the fluorescent strength is also enhanced. The wavelength shift effect and fluorescent strength enhancement effect of stacking can be obtained even if linker units are provided between the aforementioned nucleotide derivative units, allowing for more diverse fluorescence wavelengths and easier detection. For these reasons, this labeling agent is excellent for practical application in the detection of multiple detection objects at the same excitation wavelength.

When the labeling agent contains multiple nucleotide derivative units, it achieves a stacking effect by itself, and can provide the effects of shifting the fluorescence wavelength to longer wavelengths, enhancing the fluorescent strength and allowing for a diversity of fluorescent wavelengths, but even if it contains only one of the aforementioned nucleotide derivative units, it can still provide a partial effect in terms of shifting the fluorescence wavelength to longer wavelengths and enhancing the fluorescent strength. Moreover, the diversity of fluorescence wavelengths of the labeling agents can be further increased by including such a labeling agent in a set comprising a combination of labeling agents with multiple nucleotide derivative units.

The set of labeling agents disclosed in the Specification can include two or more labeling agents in which the sequences of the multiple substituents Y in the multiple nucleotide derivative units are different for each labeling agent. For the sequences to be different may mean that the sequences are configured with substituents Y of different types or in different sequences, or that the position, number or type of linker units in the sequence is different. This is because the fluorescence wavelength and the like will be different if the modes of linker units are different.

As discussed above, in addition to labeling agents containing a plurality of the aforementioned nucleotide derivative units, the set of labeling agents may contain a labeling agent with one of the aforementioned nucleotide derivative units.

The excitation wavelength applied to the labeling agent is determined by the type of substituents Y in the nucleotide derivative units in the labeling agent. For example, if pyrene (excitation wavelength by itself: 342 nm) and perylene (excitation wavelength by itself: about 450 nm) are used as the two substituents Y, they can be exposed to light having a wavelength that excites either one of these.

For example, as shown in the following scheme, the basic backbone of the labeling agent can be easily synthesized by preparing a boric acid derivative of a benzene framework with protected hydroxyl groups, and condensing halide derivatives of substituents Y in the presence of a palladium catalyst. A compound (amidite) for solid phase synthesis can also be obtained by deprotecting the hydroxyl groups of this condensed body, treating it with DMTrCl and then adding N-ethyldiisopropylamine, and then using an amidite reagent. Solid-phase synthesis of oligonucleotides using such compounds is well known to those skilled in the art.

[C4]

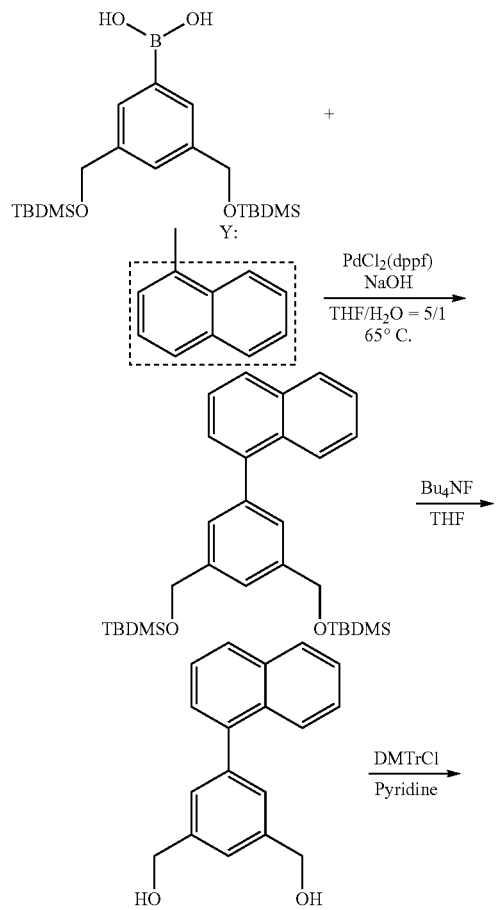

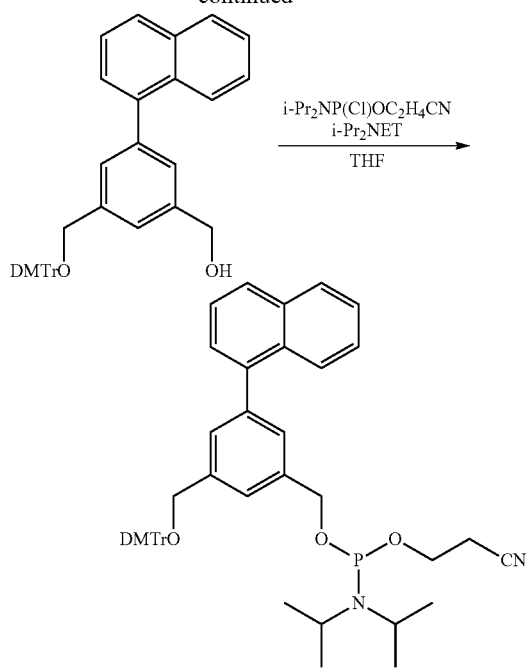

In the method described in Non-patent Document 1, a glycosyl halide of deoxyribose is condensed with a cadmium derivative of a fluorescent dye to produce two different isomers which can then be further treated, but this synthesis method is inefficient because isomerization is unavoidable.

To make it more suitable for solid phase synthesis and the like, the labeling agent may be a compound represented by Formula (4) below. Z, Y and the like in Formula (4) are defined as in Formula (1).

[C5]

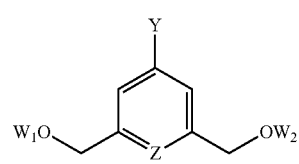

(4)

In Formula (4), $W_1$ can represent a hydrogen atom or hydroxyl protective group. A hydroxyl protective group can be any group that protects hydroxyl groups from unintended reactions. Various known, conventional hydroxyl protective groups can be used as this hydroxyl protective group, without any particular limitations. Preferred protective groups in the present invention are fluorenylmethoxycarbonyl (FMOC), dimethoxytrityl (DMT), quaternary butyldimethylsilyl (TBDMS), monomethoxytrityl, trifluoroacetyl, levulinyl and silyl groups. A trityl group is preferred, and can be selected from dimethoxytrityl (DMT) and quaternary butyldimethylsilyl (TBDMS) for example.

$W_2$ represents a hydroxyl protective group, phosphoramidite group or linking group that will be or has been bound to a solid-phase carrier. A compound in which $W_2$ is a phosphoramidite group (amidite compound) can be used as a phosphoramidite reagent to synthesize oligonucleotides by the phosphoramidite method. In the present invention, a phosphoramidite group can be represented by Formula (5) below:

[C6]

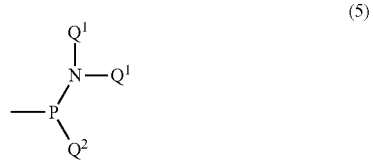

(5)

(in Formula (5), each $Q^1$ may be the same or different, and each independently represents a branched or straight-chain $C_{1-5}$ alkyl group, while $Q^2$ represents a branched or straight-chain $C_{1-5}$ alkyl group or optionally substituted alkoxyl group).

In Formula (5) above, $Q^1$ is not particularly limited but can preferably be an isopropyl group, while examples of $Q^2$ include —$OCH_3$, —OEtCN, —$OCH_2CHCH_2$ and the like.

A compound in which $W_2$ is a linking group to be linked to a solid-phase carrier in Formula (4) is held on the solid-phase carrier by binding linking group with an amino group or other specific functional group on the solid phase carrier. Moreover, in Formula (4) because in a compound in which $W_2$ is a linking group linked to a solid phase carrier the nucleotide derivative of the present invention is bound to the solid-phase carrier via the linking group, it can be used as a starting material in various kinds of solid-phase nucleic acid synthesis. An oligonucleotide having units represented by Formula (1) can be manufactured using this starting material.

The solid-phase carrier in this case is normally a polymer carrier, such as CPG (controlled pored glass), HCP (highly cross-linked polystyrene) or certain kinds of gel. The solid-phase carrier may also have suitable spacers. The linking group is the linker that links the solid phase carrier with the compound. A known succinic acid ester linker, oxalic acid ester linker, silanediyl linker, silyl linker or the like can be used as this linking group.

The labeling agent explained above can be linked to any compound to be labeled, and used to detect and analyze interactions between the labeled compound and other compounds (interactions between proteins, between proteins and oligonucleotides, between oligonucleotides, between oligonucleotides and proteins and the like), for functional analysis of RNA interference and the like in various biological molecules and artificial constructs, and for analyzing the locations of these in cells, tissues and the like.

The labeling agent can be any that is bound by some action to some location on the compound to be labeled, and can be configured to bind to any location as long as it does not interfere with detection by the compound to be labeled.

The compound to be labeled may be an oligonucleotide, protein, peptide or the like. When the compound to be labeled is an oligonucleotide, the labeled compound with the labeling agent may be a probe for detecting specific hybridization, a primer for a PCR reaction, an antisense reagent, an siRNA reagent (RNA interference agent), or some kind of microRNA reagent or the like. It can also be used as a labeling agent for labeling oligonucleotides in a sample using an array of fixed probes or the like.

The probe may alternatively take the form of a molecular beacon. In this case, multiple nucleotide derivative units of the labeling agent are preferably provided at one end (the 3' end or 5' end) of the stem of the molecular beacon, while the other end is provided with a quencher such as BHQ or Dab. With this arrangement, the fluorescence is quenched by the quencher when the molecular beacon does not hybridize with a target sequence, but when the molecular beacon hybridizes with the target sequence the stem opens, and fluorescence based on the nucleotide derivative units is observed. It can also be provided at both the 3' end and 5' end of the molecular beacon.

In the Specification, an oligonucleotide is a polymer having multiple monomer units wherein the monomer units are nucleotides, and normally an oligonucleotide comprises a polymer of from a few to about 100 nucleotides. The monomer units of the oligonucleotide may be deoxyribonucleotides or ribonucleotides, or may be chimeras of both of these. An oligonucleotide is normally a single strand, but may alternatively be in the form of a double strand including the complement strand. A double strand may be DNA/DNA, RNA/RNA, or a DNA/RNA hybrid.

The oligonucleotide may be provided with modified nucleotides other than natural bases and ribose. A modified nucleotide is one that has been chemically modified in some way in the various parts of the nucleotide, namely the base part, sugar part and phosphate part.

As a compound to be labeled, an oligonucleotide can be of a length suited to the application, but from the standpoint of oligonucleotide synthesis the length is preferably at least 10 but no more than 35. In the case of the aforementioned probe and primer, the compounds to be labeled are typically oligonucleotides having deoxyribonucleotides as monomer units. In the case of the antisense reagent, siRNA reagent and the like, the compounds to be labeled are typically oligonucleotides having ribonucleotides as monomer units.

When the compound to be labeled is a peptide or protein, the labeled compound can be used as a labeled antibody or labeled secondary antibody. The labeling agent disclosed in the Specification may also be used to label cells or the like via an intervening substance bound to or expressed on the cell surface.

The labeling agent disclosed in the Specification, or a set thereof, can be provided in the form of an analytic or diagnostic kit comprising an array or other suitable device. In this case, one or two or more reagents necessary for labeling (such as reagents for binding the labeling agent to the compound to be labeled) can also be included.

(Oligonucleotide Derivative)

The oligonucleotide derivative disclosed in the Specification is an oligonucleotide derivative provided with multiple nucleotide derivative units represented by Formula (1) above. In the oligonucleotide derivative disclosed in the Specification, the various notations in Formula (1) above have the same meanings as were given for the labeling agent with various examples. The oligonucleotide derivative disclosed in the Specification is typically an oligonucleotide that has been labeled with the labeling agent disclosed in the Specification as a labeled compound.

The position of the aforementioned nucleotide derivative units in the oligonucleotide derivative is not particularly limited, and may be at the 5' terminal end (either with or without the 5' terminal), at the 3' terminal end (with or without the 3' terminal), or in some other area. A hydroxyl group may also be bound to the 5' terminal in the oligonucleotide derivative of the present invention, as can a phosphoric acid group ($PO_4$). Similarly, a hydroxyl group may be bound to the 3' terminal of the oligonucleotide, as can a phosphoric acid group ($PO_4$). The 5' terminal and 3' terminal may also assume other suitable structures as necessary. The nucleotide derivative units disclosed in the Specification have good RNase resistance. Consequently, an oligonucleotide derivative (oligoribonucleotide derivative) with improved RNase resistance can be obtained by providing these nucleotide derivative units at RNase target sites. It is particularly desirable to provide these oligonucleotide derivative units at the terminals of siRNA, micro RNA and the like.

For example, it is desirable to provide 1 or 2 or more of the nucleotide derivative units disclosed in the Specification at the 5' terminal of an siRNA passenger strand. It is even more desirable to provide 1 or 2 or more of the nucleotide derivatives disclosed in the Specification at the corresponding site of a guide strand paired with this passenger strand (3' terminal end of guide strand). Thus, when the passenger strand is paired with the guide strand, the nucleotide derivative units disclosed here will form a stack structure with one another, thereby stabilizing the region with the introduced nucleotide derivative both thermally and thermodynamically, resulting in increased siRNA activity and greater nuclease resistance of the guide strand. It is sufficient that at least one pair of the nucleotide derivative units disclosed in the Specification be formed at the 5' terminal of the passenger strand and the 3' terminal of the guide strand. That is, the passenger strand and guide strand may each have at least one of the aforementioned nucleotide derivative units.

Figure 27:
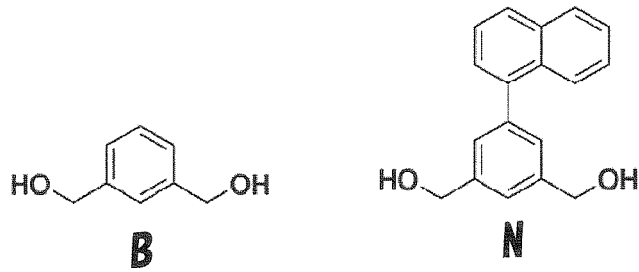
FIG. 27 shows the nuclease resistance of siRNA.
Figure 27:
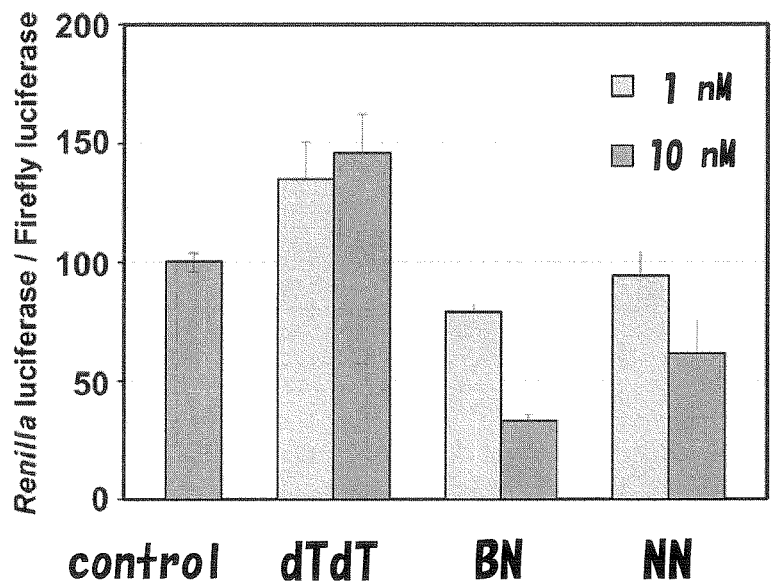
Figure 28:
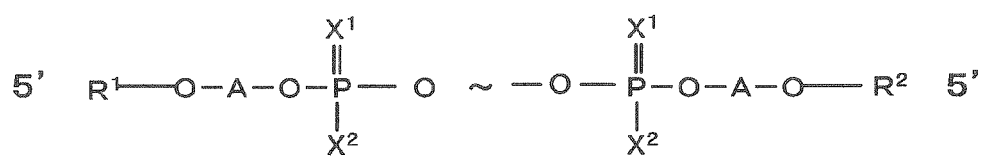
FIG. 28 shows examples of benzene/pyridine-phosphoric acid derivative units.
Figure 28:
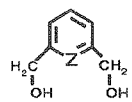
Figure 28:
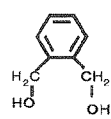
Figure 28:
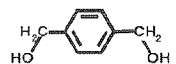
Figure 28:
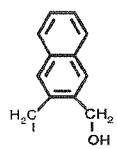
Figure 28:
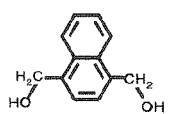
Figure 28:
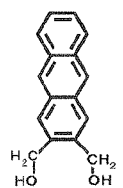
Figure 28:
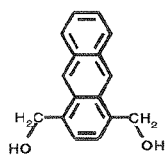

One or two or more of the units shown in FIG. 27, which are benzene or pyridine backbones of the nucleotide derivative unit disclosed in the Specification without substituent Y (hereunder, benzene/pyridine-phosphoric acid derivative unit; disclosed by the inventors in WO2007/094135; see FIG. 28) can be provided further towards the 3' terminal from the 3' terminal nucleotide derivative unit of the guide strand. This serves to effectively improve nuclease resistance. The 3' terminal of the passenger strand can be provided with 1 or 2 or more, or preferably 2 or more, benzene-phosphoric acid derivative units. This serves to increase the nuclease resistance of the passenger strand. As shown in the upper part of FIG. 28, an example of a benzene/pyridine-phosphoric acid derivative unit is a unit containing A (2a to 2g in FIG. 28) linked to an adjacent nucleotide unit or the like via a phosphoric acid ester group. In 2a, Z is C or N. A is preferably 2a or 2b, or more preferably 2a. Even at the end of the oligonucleotide derivative, the unit containing A is linked with a nucleotide unit and phosphoric acid ester on either side. At the 3' and 5' termini, R1 and R2 can be hydrogen atoms, hydroxyl protective groups or the like.

The arrangement of the nucleotide derivative units and benzene-phosphoric acid derivative units disclosed in the Specification in the siRNA or the like is set according to the expected nuclease. For example, in the embodiment above, the aim is to increase resistance to nucleases that principally attack the 3' terminal. For exonucleases and endonucleases that attack the 5' terminal, therefor, this site would be provided with at least one pair of the nucleotide derivative units disclosed in the Specification.

The oligonucleotide derivative of the present invention may have ribonucleotide units and/or deoxyribonucleotide units in addition to the nucleotide derivative units of the present invention. The oligonucleotide derivative of the present invention can assume a variety of forms as discussed above as long as it contains the aforementioned nucleotide derivative units.

The oligonucleotide derivative disclosed in the Specification can be provided with linker units as necessary as explained above. Of course, a polynucleotide provided with the nucleotide derivative units of the present invention is also provided by the present invention.

The oligonucleotide derivative disclosed in the Specification can be synthesized by the methods already explained above using synthetic amidite.

Because the oligonucleotide derivative disclosed in the Specification is provided with the aforementioned nucleotide derivative units, it has enhanced fluorescent strength and a fluorescence wavelength shifted to a longer wavelength. A variety of colors of fluorescence can be emitted at a single excitation wavelength by using a combination of two or more oligonucleotide derivatives provided with nucleotide derivative units having different sequences of substituent Y.

The oligonucleotide derivative disclosed in the Specification may be used as a probe and a primer. In particular, when multiple such oligonucleotide derivatives are used as a probe set or primer set, multiple specific hybridization targets can be easily detected at a single excitation wavelength. This detection method is extremely useful in DNA and RNA functional analysis, and in various kinds of analysis and diagnosis. These oligonucleotide derivatives can be held on a solid-phase carrier such as a chip or beads, and used as a detection device or diagnostic device or as part of such a device.

A probe is an oligonucleotide that has a nucleotide sequence designated specifically for a target nucleic acid either by design or selection, and that has been obtained for the purpose of hybridization with the target nucleic acid under specific conditions of stringency. Typically, its units are deoxyribonucleotides. As discussed above, the oligonucleotide probe of the present invention can preferably be used for RNA detection in cells, and especially for real-time detection. A primer is an oligonucleotide that has a nucleotide sequence designated specifically for part of a target nucleic acid to be amplified by PCR, and that has been obtained for the purpose of hybridizing with the target nucleic acid under specific conditions of stringency (PCR reaction conditions). Typically, its units are deoxyribonucleotides.

The probe and primer can typically be used as detection reagents, diagnostic reagents and the like. A chip, beads or another solid-phase carrier or the like having these oligonucleotide derivatives held thereon can be used as a detection device or diagnostic device, or as part of such a device. Such a detection reagent or diagnostic reagent can also be combined with other reagents, diagnostic agents, devices or the like for use as a detection kit or diagnostic kit.

The oligonucleotide derivative disclosed in the Specification can take the form of various gene expression regulators. That is, it can be used in an antigene or antisense and in an aptamer, miRNA or ribozyme. Moreover, the oligonucleotide according to the present invention can be utilized for siRNA, shRNA, antisense, ribozyme and aptamer. Typically, this oligonucleotide derivative consists of ribonucleotide units.

The disclosures of the Specification provide a method for detecting SNPs, mutations and other target nucleic acids using the aforementioned oligonucleotide derivative as a probe, and a method for suppressing gene expression and method of functional gene analysis using the aforementioned oligonucleotide derivative as a gene expression inhibitor with an siRNA or antisense function or the like.

The present invention is explained in detail below using examples, but these examples do not limit the present invention.

First Embodiment

Test Example 1

Synthesis of Benzene Analog

Figure 2:
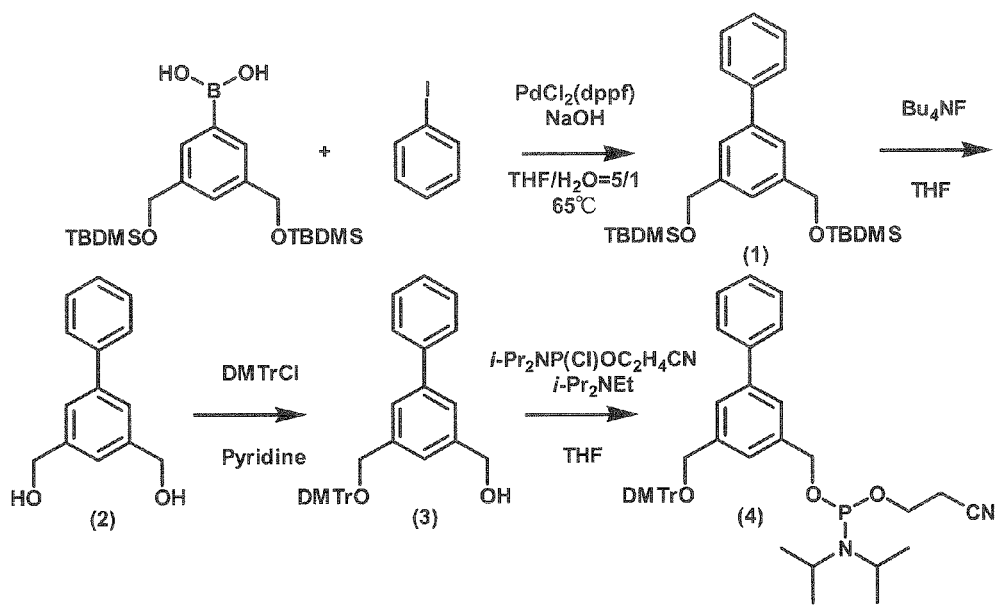
FIG. 2 shows a benzene analog synthesis scheme.

Using a boric acid derivative as the starting material, Compound (1) was synthesized according to the scheme shown in FIG. 2 by coupling with iodobenzene in the presence of palladium. Next, Compound (2) was synthesized by desilylation with a 2-step yield of 88%. Compound (3) was synthesized by tritylation with a yield of 38%, and the target Compound (4) was then synthesized quantitatively by amidite conversion. The details are as follows.

Synthesis of 6-(3,5-bis-tert-butyldimethylsilyloxymethylphenyl)-benzene (1)

12 ml of THF/H$_2$O was added to 0.498 g (2.44 mmol) of iodobenzene, and 0.122 g (5 mol %) of PdCl$_2$ (dppf) was then added in a darkroom. 1 g (2.44 mmol) of 3,5-bis-tert-butyldimethylsilyloxymethyl phenylboronic acid dissolved in 12 ml of THF/H$_2$O was added, 3.66 ml (3 eq) of 2N NaOH aq was injected, the reaction was initiated in an oil bath at 65° C. with light shielding, and the mixture was agitated for 6 days. Completion of the reaction could not be confirmed because the raw material iodobenzene overlaps the target product in TLC (Hex only). This was extracted with EtOAc, and the organic layer was washed with H$_2$O, sat. NaHCO$_3$ aq and sat. NaCl aq, and dried by addition of anhydrous NaSO$_4$. The solvent was distilled off under reduced pressure, and 1.1651 g of a mixture of the target product and iodobenzene was obtained by silica gel chromatography (Hex:EtOAc=5:1).

Synthesis of 3-(3,5-bis-tert-butyldimethylsilyloxymethylphenyl)-benzene (2)

7.92 ml of THF was added to 1.1651 g of mixture of Compound (1) in an Ar atmosphere, and 7.92 ml (7.92 mmol, 3 eq) of 1MTBAF was dripped in. This was agitated for 72 hours in an Ar atmosphere. The solvent was distilled off under reduced pressure, and 0.4596 g (2.15 mmol, 2-step 88%) of Compound (2) was isolated by silica gel chromatography (chloroform:methanol=50:1).
$^1$H NMR (400 MHz) (CDCl$_3$) δ: 7.60 (2H, s, benzene ring), 7.53 (1H, s, benzene ring), 7.45 (3H, s, H-2.3.4), 7.37 (2H, s, H-1.5), 4.78 (4H, s, CH$_2$), 1.80 (2H, s, OH)
Elemental analysis: H=6.46%, C=78.29%
Calculated: H=6.59%, C=78.48%
Mass: C$_{14}$H$_{14}$O$_2$=241.09998
Calculated: 214.09938

Synthesis of 1-(3-hydroxymethyl-5-(4,4'-dimethoxytrityloxy)methylphenyl)-benzene (3)

10.7 ml of pyrizine was added to dissolve 0.4596 g of Compound (2) in an Ar atmosphere, and 0.9547 g (2.80 mmol, 1.3 eq) of DMTrCl was added. This was agitated for 96 hours in an Ar atmosphere. After extraction with chloroform the organic layer was washed with H$_2$O, sat. NaHCO$_3$ aq and sat. NaCl aq, and dried by addition of anhydrous NaSO$_4$. The solvent was distilled off under reduced pressure, and 0.4231 g (0.82 mmol, 38%) of Compound (3) was isolated by silica gel chromatography (chloroform:methanol=100:1).
$^1$H NMR (400 MHz) (CDCl$_3$) δ: 7.60 (2H, s, benzene ring), 7.53 (1H, s, benzene ring), 7.45 (3H, s, H-2.3.4), 6.85 (2H, s, H-1.5), 7.26 (13H, m, DMTr), 4.77 (2H, s, CH$_2$), 4.25 (2H, s, CH$_2$), 3.79 (6H, s, OCH$_3$), 1.69 (1H, s, OH)

Synthesis of 1-(3-(4,4'-dimethoxytrityloxy)methyl-5-0-{(2-cyanoethyl)-(N,N-diisopropyl)}-Phosphamidicmethylphenyl)-benzene (4)

0.42 g (0.82 mmol) of Compound (4) was dried thoroughly together with the test equipment, 8.2 ml of THF was added in argon using an Ar-substituted glove bag, and 0.39 ml (1.64 mmol, 2.0 eq) of a phosphitylation reagent was added in the presence of 0.53 ml of HunigBase (4.10 mmol, 5.0 eq), and agitated at room temperature for 30 minutes. This was extracted with chloroform, and the organic layer was washed with H$_2$O, sat. NaHCO$_3$ aq and sat. NaCl aq, and dried by addition of anhydrous NaSO$_4$. The solvent was distilled off under reduced pressure, and 0.678 g of mixture (4) was obtain quantitatively by silica gel chromatography (EtOAc only).
$^{31}$PNMR (400 MHz, CDCL$_3$) δ [ppm]: 149.89 ppm 148.97 ppn Test Example 2

Synthesis of Naphthalene Analog

Figure 3:
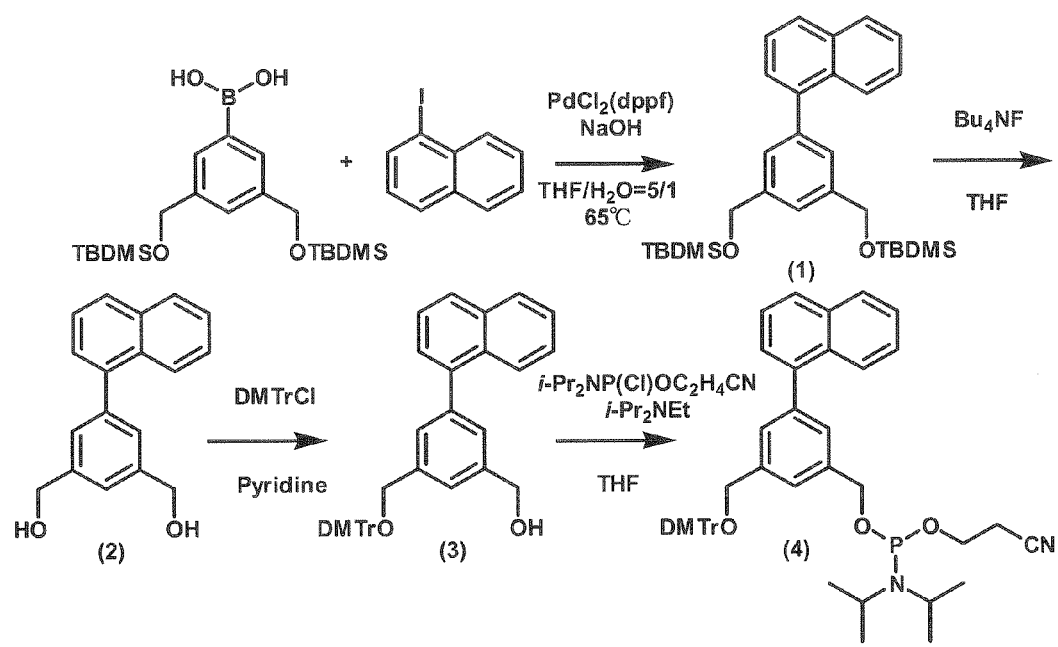
FIG. 3 shows a naphthalene analog synthesis scheme.

Using a boric acid derivative as the starting material, Compound (5) was synthesized in accordance with the scheme shown in FIG. 3 by coupling with iodonaphthalene in the presence of palladium. Next, Compound (6) was synthesized by desilylation with a 2-step yield of 84%. Compound (7) was synthesized by tritylation with a yield of 37%, and the target compound (8) was synthesized by amidite conversion with a yield of 85%. The details are as follows.

Synthesis of 6-(3,5-bis-tert-butyldimethylsilyloxymethylphenyl)-naphthalene (5)

12 ml of THF/H$_2$O was added to 0.6199 g (2.44 mmol) of iodonaphthalene, and 0.122 g (5 mol %) of PdCl2 (dppf) was added in a darkroom. 1 g (2.44 mmol) of 3,5-bis-tert-butyldimethylsilyloxymethyl Phenylboronic acid dissolved in 12 ml of THF/H$_2$O was added, 3.66 ml (3 eq) of 2N NaOH aq was injected, the reaction was initiated in a 65° C. oil bath with light shielding, and the mixture was agitated for 24 hours. Completion of the reaction could not be confirmed because the raw material iodonaphthalene overlaps the target product in TLC (Hex only). Fluorescence was confirmed with the naked eye. This was extracted with EtOAc, and the organic layer was washed with H$_2$O, sat. NaHCO$_3$ aq and sat. NaCl aq, and dried by addition of anhydrous NaSO$_4$. The solvent was distilled off under reduced pressure to obtain 1.6530 g of a mixture of the target product and iodonaphthalene.

Synthesis of 3-(3,5-bis-tert-butyldimethylsilyloxymethylphenyl)-naphthalene (6)

7.32 ml of THF was added to 1.653 g of mixture (5) in an Ar atmosphere, and 7.32 ml of 1MTBAF (7.32 mmol, 3 eq) was dripped in. This was agitated or 72 hours in an Ar atmosphere. The solvent was distilled off under reduced pressure, and 0.5448 g (2.06 mmol, 2-step 84%) was isolated by silica gel chromatography (chloroform:methanol=50:1).
$^1$H NMR (400 MHz) (CDCl$_3$) δ: 7.90 (4H, s, H-6,7,8,9), 7.53 (2H, s, benzene ring), 7.51 (1H, s, benzene ring), 7.42 (1H, s, H-3), 7.41 (2H, s, H-2,4), 4.79 (4H, s, CH$_2$), 1.35 (2H, s, OH)
Elemental analysis: H=6.13%, C=80.96%
Calculated: H=6.10%, C=81.79%
Mass: C$_{18}$H$_{16}$O$_2$=264.11455
Calculated: 264.11503

Synthesis of 1-(3-hydroxymethyl-5-(4,4'-dimethoxytrityloxy)methylphenyl)-naphthalene (7)

10.3 ml of pyrizine was added to dissolve 0.5448 g of Compound (6) in an Ar atmosphere, and 0.909 g (2.68 mmol, 1.3 eq) of DMTrCl was added. This was agitated for 18 hours in an Ar atmosphere. After extraction with chloroform, the organic layer was washed with $H_2O$, sat. $NaHCO_3$ aq and sat. NaCl aq, and dried by addition of anhydrous $NaSO_4$. The solvent was distilled off under reduced pressure, and 0.4293 g (0.75 mmol, 37%) of Compound (7) was isolated by silica gel chromatography (chloroform only→chloroform:methanol=15:1).

$^1$H NMR (400 MHz) (CDCl$_3$) δ: 7.92 (4H, s, H-6,7,8,9), 7.53 (2H, s, benzene ring), 7.51 (1H, s, benzene ring), 7.42 (1H, s, H-3), 7.41 (2H, s, H-2,4), 7.41 (13H, m, DMTr), 6.83 (6H, s, OCH$_3$), 4.80 (2H, s, CH$_2$), 4.27 (2H, s, CH$_2$), 1.60 (1H, s, OH)

Synthesis of 1-(3-(4,4'-dimethoxytrityloxy)methyl-5-0-{(2-cyanoethyl)-(N,N-diisoropyl)}-phosphoamidicmethylphenyl)-naphthalene (8)

0.43 g (0.75 mmol) of Compound (7) was thoroughly dried together with the test equipment, 7.5 ml of THF was added in argon using an Ar-substituted glove bag, and 0.35 ml (1.50 mmol, 2.0 eq) of a phosphitylation reagent was added in the presence of 0.48 ml of HunigBase (3.75 mmol, 5.0 eq), and agitated for 30 minutes at room temperature. This was extracted with chloroform, and the organic layer was washed with $H_2O$, sat. $NaHCO_3$ aq and sat. NaCl aq, and dried by addition of anhydrous $NaSO_4$. The solvent was distilled off under reduced pressure, and 0.513 g (0.64 mmol, 85%) of Compound (8) was obtained by silica gel chromatography (EtOAc only).

$^{31}$PNMR (400 MHz, CDCL$_3$) δ [ppm]: 149.00 PPm

Test Example 3

Synthesis of Phenanthrene Analog

Figure 4:
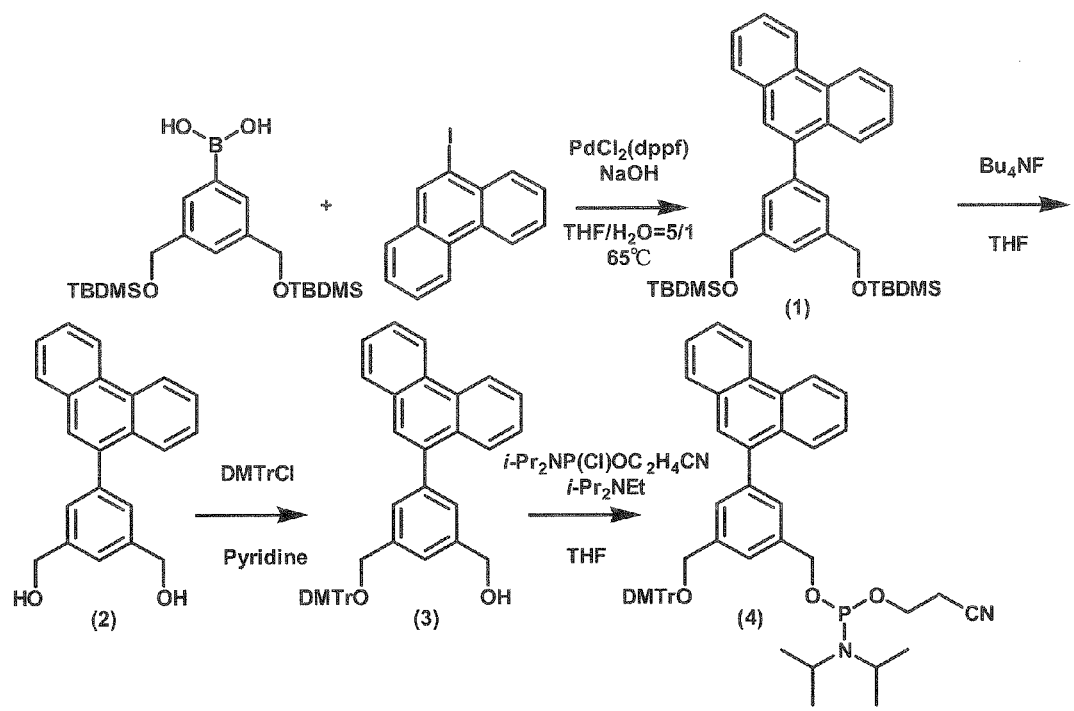
FIG. 4 shows a phenanthrene analog synthesis scheme.

Using a boric acid derivative as the starting material, Compound (9) was synthesized in accordance with the scheme shown in FIG. 4 by coupling with iodophenanthrene in the presence of palladium. Next, Compound (10) was synthesized by desilylation. Compound (11) was synthesized by tritylation with a 3-step yield of 23%, and target Compound (12) was synthesized by amidite conversion with a yield of 70%. The details are as follows.

Synthesis of 6-(3,5-bis-tert-butyldimethylsilyloxymethylphenyl)-phenanthrene (9)

0.122 g (5 mol %) of Pdcl2 (dppf) was added to 0.742 g (2.44 mmol) of iodophenanthrene in a darkroom, and dissolved with 12 ml of THF/$H_2O$. 0.90 g (2.19 mmol) of 3,5-bis-tert-butyldimethylsilyloxymethyl Phenylboronic acid dissolved in 12 ml of THF/$H_2O$ was added, 3.66 ml (3 eq) of 2N NaOH aq was injected, the reaction was initiated in a 65° C. oil bath with light shielding, and the mixture was agitated for 24 hours. Completion of the reaction could not be confirmed because the raw material iodophenanthrene overlaps the target product in TLC (Hex:EtOAc=1:1). Fluorescence was confirmed with the naked eye. This was extracted with EtOAc, and the organic layer was washed with $H_2O$, sat. $NaHCO_3$ aq and sat. NaCl aq, and dried by addition of anhydrous $NaSO_4$. The solvent was distilled off under reduced pressure to obtain 1.2749 g of a mixture of the target product and iodophenanthrene.

Synthesis of 3-(3,5-bis-tert-butyldimethylsilyloxymethylphenyl)-phenanthrene (10)

6.57 ml of THF was added to 1.2749 g of mixture of Compound (9) in an Ar atmosphere, and 6.57 ml (6.57 mmol, 3 eq) of 1MTBAF was dripped in. This was agitated for 2 days in an Ar atmosphere. The solvent was distilled off under reduced pressure, and 0.9324 g of Compound (10) was isolated in the TBAF residue by silica gel chromatography (chloroform:methanol=50:1).

$^1$H NMR (400 MHz) (DMSO) δ: 8.90 (4H, d, H-4,5,6,7) 7.90 (4H, d, H-10,11,12,13), 7.39 (1H, s, benzene ring), 7.33 (2H, s, benzene ring), 5.26 (2H, s, OH), 4.60 (4H, s, CH$_2$)
Elemental analysis: H=5.86%, C=83.14%
Calculated: H=5.77%, C=84.05%
Mass: $C_{22}H_{18}O_2$=314.13148
Calculated: 314.13068

Synthesis of 1-(3-hydroxymethyl-5-(4,4'-dimethoxytrityloxy)methylphenyl)-phenanthrene (11)

14.5 ml of pyrizine was added to dissolve 0.932 g of Compound (10) in an Ar atmosphere, and 1.27 g (3.77 mmol, 1.3 eq) of DMTrCl were added. This was agitated for 27 hours in an Ar atmosphere. After extraction with chloroform, the organic layer was washed with $H_2O$, sat. $NaHCO_3$ aq and sat. NaCl aq, and dried by addition of anhydrous $NaSO_4$. The solvent was distilled off under reduced pressure, and 0.3473 g (0.56 mmol, 3-step 23%) of Compound (11) was isolated by silica gel chromatography (chloroform only→chloroform:methanol=100:1).

$^1$H NMR (400 MHz) (DMSO) δ: 8.90 (4H, d, H-4,5,6,7) 7.90 (4H, d, H-10,11,12,13), 7.39 (1H, s, benzene ring), 7.33 (2H, s, benzene ring), 7.25 (13H, m, DMTr), ??? (1H, s, OH), 4.78 (2H, d, J=5.6, CH$_2$), 4.27 (2H, s, CH$_2$), 3.78 (6H, s, OCH$_3$)

Synthesis of 1-(3-(4,4'-dimethoxytrityloxy)methyl-5-0-{(2-cyanoethyl)-(N,N-diisopropyl)}-phosphoamidicmethylphenyl)-Phenanthrene (12)

0.35 g (0.56 mmol) of Compound (11) was dried thoroughly together with the test equipment, 5.6 ml of THF was added in argon using an Ar-substituted glove bag, and 0.26 ml (1.12 mmol, 2.0 eq) of a phosphitylation reagent was added in the presence of 0.36 ml (2.80 mmol, 5.0 eq) of HunigBase, and agitated for 30 minutes at room temperature. This was extracted with chloroform, and the organic layer was washed with $H_2O$, sat. $NaHCO_3$ aq and sat. NaCl aq, and dried by addition of anhydrous $NaSO_4$. The solvent was distilled off under reduced pressure, and 0.335 g (0.39 mmol, 70%) of Compound (12) was obtained by silica gel chromatography (EtOAc only).

$^{31}$PNMR (400 MHz, CDCL$_3$) δ [ppm]: 148.97 ppm

Test Example 4

Synthesis of Pyrene Analog

Figure 5:
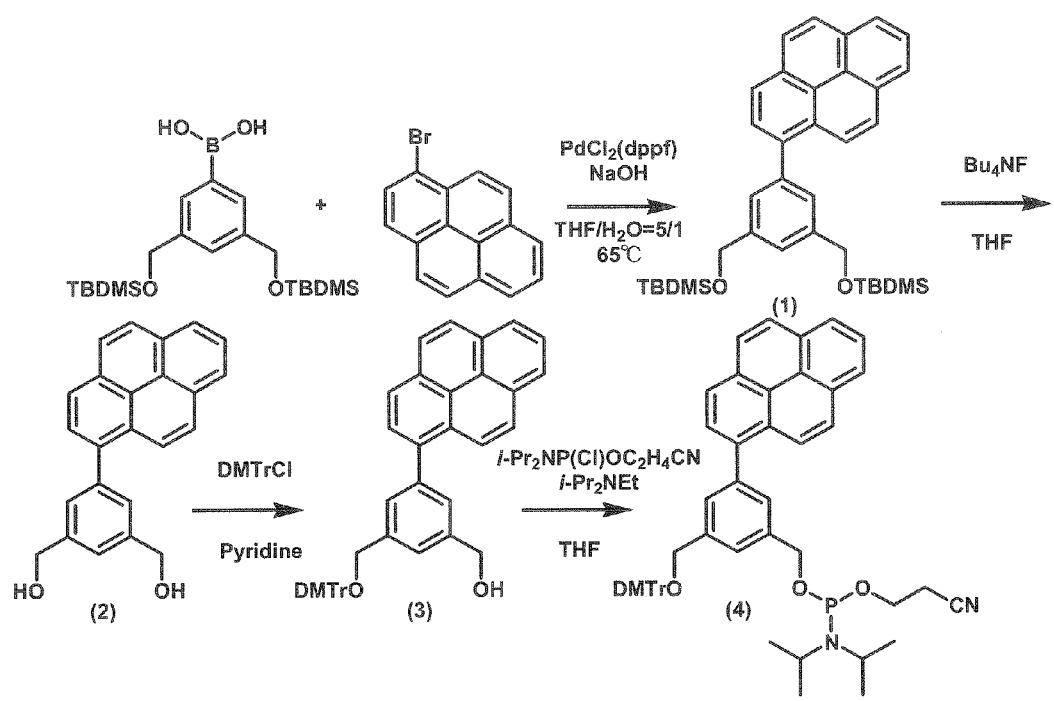
FIG. 5 shows a pyrene analog synthesis scheme.

Using a boric acid derivative as the starting material, Compound (13) was synthesized in accordance with the scheme shown in FIG. 5 by coupling with bromopyrene in the presence of palladium. Next, Compound (14) was synthesized by desilylation. Compound (15) was synthesized by tritylation with a 3-step yield of 30%, and the target Compound (16) was synthesized quantitatively by amidite conversion. The details are as follows.

Synthesis of 6-(3,5-bis-tert-butyldimethylsilyloxymethylphenyl)-pyrene (13)

0.122 g (5 mol %) of PdCl2 (dppf) was added to 0.686 g (2.44 mmol) of 1-bromopyrene in a darkroom, and dissolved with 12 ml of THF/H$_2$O. 1.0 g (2.19 mmol) of 3,5-bis-tert-butyldimethylsilyloxymethyl Phenylboronic acid dissolved in 12 ml of THF/H$_2$O was added, 3.66 ml (3 eq) of 2N NaOHaq was injected, the reaction was initiated in a 65° C. oil bath with light shielding, and the mixture was agitated for 24 hours. Strong fluorescence was continued with the naked eye by TLC (Hex:EtOAc=5:1). This was extracted with EtOAc, and the organic layer was washed with H$_2$O, sat. NaHCO$_3$ aq and sat. NaCl aq, and dried by addition of anhydrous NaSO$_4$. The solvent was distilled off under reduced pressure to obtain 1.5203 g of a mixture of the target product and hydrolysates.

Synthesis of 3-(3,5-bis-tert-butyldimethylsilyloxymethylphenyl)-pyrene (14)

7.32 ml of THF was added to 1.5203 g of mixture of Compound (13) in an Ar atmosphere, and 7.32 ml (7.32 mmol, 3 eq) of 1MTBAF was dripped in. This was agitated for 2 days in an Ar atmosphere. The solvent was distilled off under reduced pressure, and 0.9324 g of Compound (14) was obtained by silica gel chromatography (chloroform:methanol=50:1) in the TBAF residue.

$^1$H NMR (400 MHz) (DMSO) δ: 8.32 (5H, d, H-6,8,9,10, 12) 8.22 (2H, d, H-5,13), 8.14 (2H, d, H-2,3), 8.09 (1H, s, benzene ring), 8.00 (2H, s, benzene ring), 5.30 (2H, s, OH), 4.63 (4H, s, CH$_2$)

Elemental analysis: H=5.37%, C=84.21%
Calculated: H=5.36%, C=85.18%
Mass: C$_{24}$H$_{18}$O$_2$=338.13123
Calculated: 338.13068

Synthesis of 1-(3-hydroxymethyl-5-(4,4'-dimethoxytrityloxy)methylphenyl)-pyrene (15)

14.5 ml of pyrizine were added to dissolve 0.932 g of Compound (14) in an Ar atmosphere, and 1.27 g (3.77 mmol, 1.3 eq) of DMTrCl was added. This was agitated for 27 hours in an Ar atmosphere. After extraction with chloroform, the organic layer was washed with H$_2$O, sat. NaHCO$_3$ aq and sat. NaCl aq, and dried by addition of anhydrous NaSO$_4$. The solvent was distilled off under reduced pressure, and 0.4632 g (0.72 mmol, 3-step 30%) of Compound (14) was isolated by silica gel chromatography (chloroform only→chloroform:methanol=100:1).

$^1$H NMR (400 MHz) (DMSO) δ: 8.56 (5H, d, H-6,8,9,10, 12) 8.22 (2H, d, H-5,13), 8.18 (2H, d, H-2,3), 8.09 (1H, s, benzene ring), 8.02 (2H, s, benzene ring), 7.25 (13H, m, DMTr), 5.32 (1H, s, OH), 4.65 (2H, d, J=5.6, CH$_2$), 4.23 (2H, s, CH$_2$), 3.16 (6H, s, OCH$_3$)

Synthesis of 1-(3-(4,4'-dimethoxytrityloxy)methyl-5-0-{(2-cyanoethyl)-(N,N-diisopropyl)}-phosphoamidicmethylphenyl)-pyrene (16)

0.46 g (0.72 mmol) of Compound (15) was dried thoroughly together with the test equipment, 7.2 ml of THF was added in argon using an Ar-substituted glove bag, and 0.34 ml (1.44 mmol, 2.0 eq) of a phosphitylation reagent was added in the presence of 0.46 ml (3.60 mmol, 5 eq) of HunigBase, and agitated for 30 minutes at room temperature. This was extracted with chloroform, and the organic layer was washed with H$_2$O, sat. NaHCO$_3$ aq and sat. NaCl aq, and dried by addition of anhydrous NaSO$_4$. The solvent was distilled off under reduced pressure, and 0.7091 g of mixture (16) was obtained quantitatively by silica gel chromatography (EtOAc only).

$^{31}$PNMR (400 MHz, CDCl$_3$) δ [ppm]: 149.01 ppm

Test Example 5

Absorbency Measurement

The absorbency and fluorescent strength of the respective raw materials and the synthesized benzene-type fluorosides (normal form) were measured and compared. That is, 5 mg each of samples (2), (6), (10) and (14) and the respective raw materials was dissolved in 1 ml of MeOH. Using these, 0.03 μmol/ml was prepared in a 2-step process. Absorbency was measured after confirming with an absorbency meter that the peak value was 1 or less. The results are shown in FIGS. 6 and 7.

Figure 6:
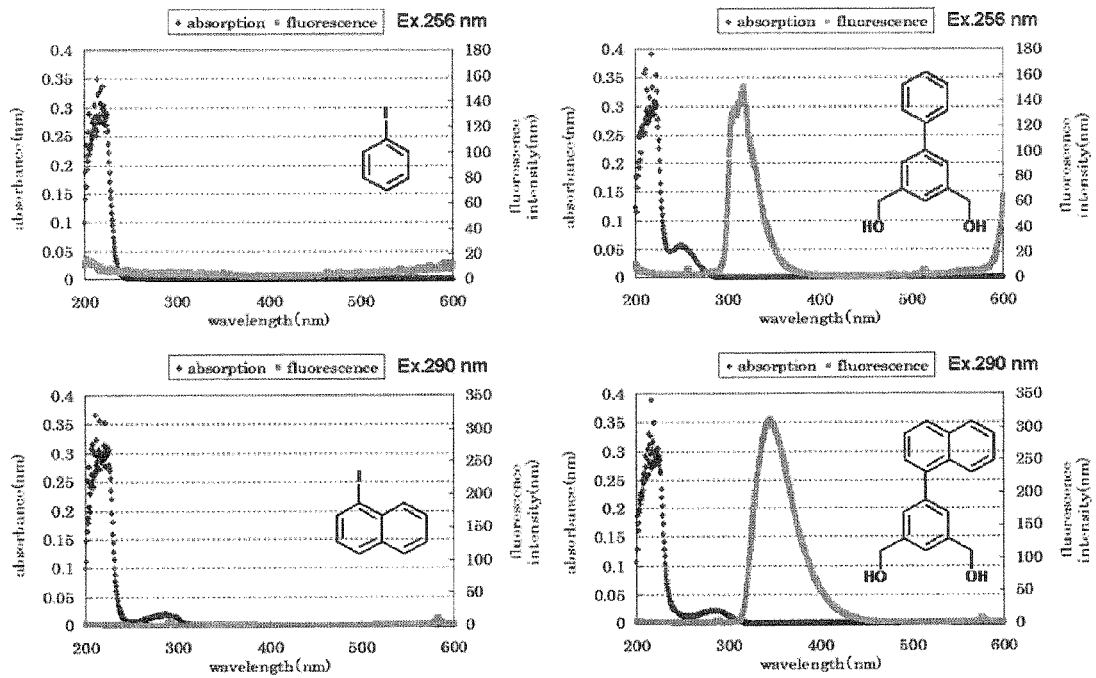
FIG. 6 is a comparison of changes in the fluorescence spectrum caused by fluorosidation using benzene and naphthalene.
Figure 6:
Figure 6:
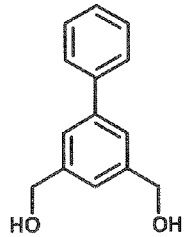
Figure 6:
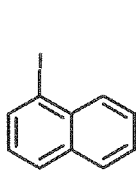
Figure 6:
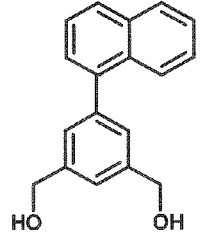
Figure 7:
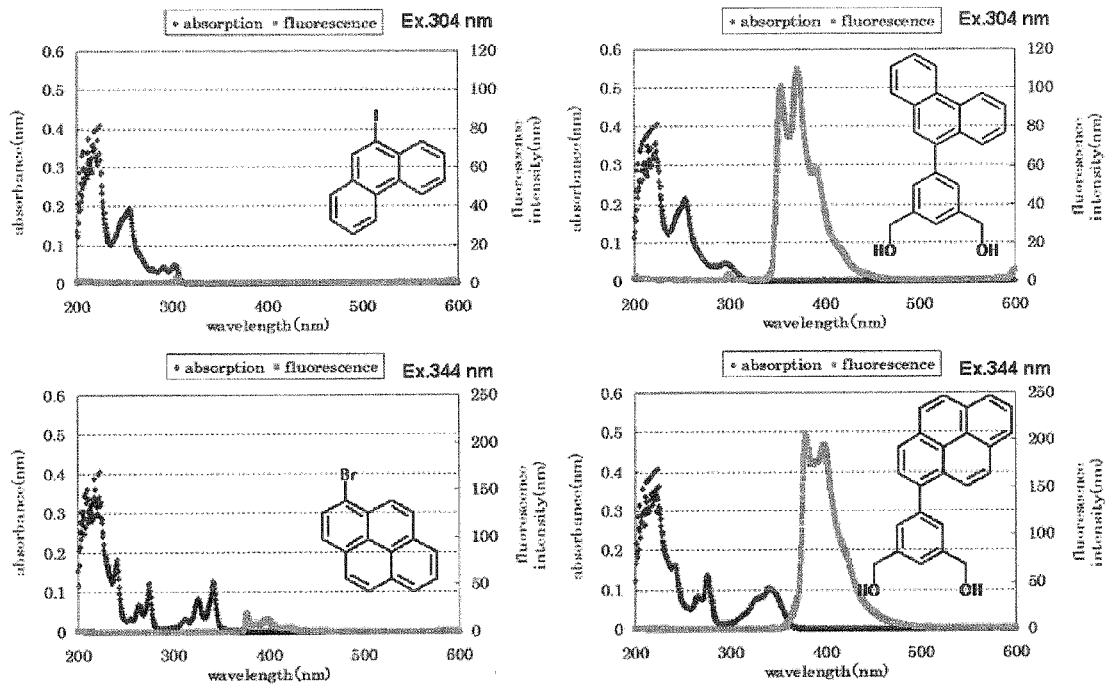
FIG. 7 is a comparison of changes in the fluorescence spectrum caused by fluorosidation using phenanthrene and pyrene.
Figure 7:
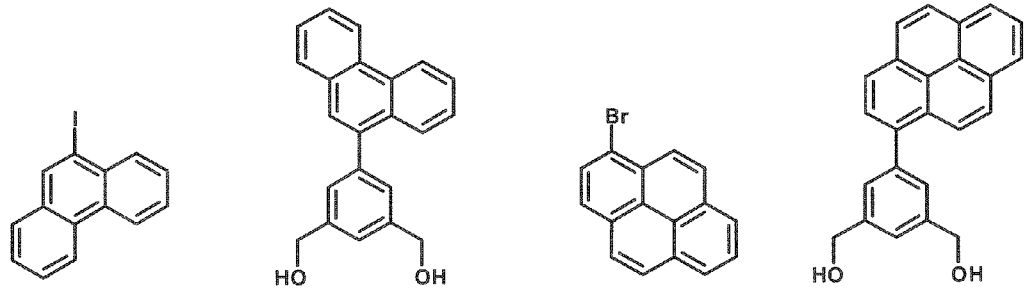

As shown in FIG. 6, the benzene and naphthalene analog fluorosides exhibited much greater fluorescent strength than the raw materials based on a comparison with benzene and naphthalene. As shown in FIG. 7, the phenanthrene and pyrene analog fluorosides similarly exhibited much greater fluorescent strength than the raw materials based on a comparison with phenanthrene and pyrene. This shows that greater fluorescent strength is obtained when a fluoroside oligomer is synthesized using a benzene-type fluoroside.

From this, it can be seen that with a fluoroside comprising a fluorescent compound introduced into a benzene-phosphate backbone (which is of the densely π-electron filled type), the electron density of the densely π-electron filled backbone is lowered due to photoexcited electron movement, resulting in changes in excitation and fluorescence wavelengths, a further increase in fluorescent strength, and other changes in the fluorescence characteristics. The benzene-phosphate backbone can also improve the nuclease resistance.

Test Example 6

Synthesis of Pyrene Analogs

Synthesis of 6-(3,5-bis-tert-butyldimethylsilyloxymethylphenyl)-pyrene (1)

Following the scheme shown in FIG. 5, PdCl2 (dppf) (0.122 g, 5 mol %) was added to 1-bromopyrene (0.686 g, 2.44 mmol) in a darkroom, and then dissolved with THF/H$_2$O (12 ml). 3,5-bis-tert-butyldimethylsilyloxymethyl phenylboronic acid (1.0 g, 2.19 mmol) dissolved in THF/H$_2$O (24 ml) was added, 2N NaOHaq (3.66 ml, 3 eq) was injected, the reaction was initiated in a 65° C. oil bath with light shielding, and the mixture was agitated for 2 days. Strong fluorescence was confirmed with the naked eye in TLC (Hex:EtOAc=5:1). After the reaction was confirmed, this was extracted with ethyl acetate, and the organic layer was washed with saturated saline and dried by addition of anhydrous sodium sulfate. The solvent was distilled off under reduced pressure to obtain the target product as a mixture (1.28 g).

Synthesis of 3-(3,5-bis-tert-butyldimethylsilyloxymethylphenyl)-pyrene (2)

THF (22.7 ml) and CH$_2$Cl$_2$ (22.7 ml) were added to mixture (1) (1.29 g) in an Ar atmosphere, and TBAF (1.14 ml, 1.14 mmol, 0.5 eq) was dripped in. This was agitated for 45 minutes in an Ar atmosphere. The reaction was confirmed by TLC (chloroform:methanol=10:1). After the reaction was confirmed, this was extracted with ethyl acetate, and the organic layer was washed with saturated saline and dried by addition of anhydrous sodium sulfate. The solvent was distilled off under reduced pressure, and Compound (2) (0.416 g, 1.23 mmol, 54.2% 2-steps) was obtained by silica gel chromatography (chloroform:methanol=15:1 to 10:1).

$^1$H NMR (400 MHz) (DMSO) δ: 8.32 (5H, d, H-6,8,9,10, 12) 8.22 (2H, d, H-5,13), 8.14 (2H, d, H-2,3), 8.09 (1H, s, benzene ring), 8.00 (2H, s, benzene ring), 5.30 (2H, s, OH), 4.63 (4H, s, $CH_2$)

Synthesis of 1-(3-hydroxymethyl-5-(4,4'-dimethoxytrityloxy)methylphenyl)-pyrene (3)

Pyridine (9.06 ml) was added to dissolve Compound (2) (0.41 g, 1.21 mmol) in an Ar atmosphere, and DMTrCl (0.46 g, 1.36 mmol, 1.1 eq) was added. This was agitated for 4 hours in an Ar atmosphere, and the reaction was confirmed by TLC (chloroform:methanol=10:1). After confirmation of the reaction, this was extracted with chloroform, and the organic layer was washed with saturated saline and dried by addition of anhydrous sodium sulfate. The solvent was distilled off under reduced pressure, and Compound (3) (0.4478 g, 0.699 mmol, 57.8%) and raw materials (0.113 g, 0.334 mmol, 27.7%) were obtained by silica gel chromatography (chloroform:methanol=50:1 to 10:1).

$^1$H NMR (400 MHz) (DMSO) δ: 8.56 (5H, d, H-6,8,9,10, 12) 8.22 (2H, d, H-5,13), 8.18 (2H, d, H-2,3), 8.09 (1H, s, benzene ring), 8.02 (2H, s, benzene ring), 7.25 (13H, m, DMTr), 5.32 (1H, s, OH), 4.65 (2H, d, J=5.6, $CH_2$), 4.23 (2H, s, $CH_2$), 3.16 (6H, s, $OCH_3$)

Synthesis of 1-(3-(4,4'-dimethoxytrityloxy)methyl-5-0-{(2-cyanoethyl)-(N,N-diisopropyl)}-phosphoamidicmethylphenyl)-pyrene (4)

The reaction was carried out in a glove bag (in argon, completely anhydrous) under RNA conditions. Compound (3) (0.44 g, 0.688 mmol) was dissolved in THF (3.43 ml), Hunig's Base (N-ethyl diisopropylamine, 0.565 ml, 3.44 mmol, 5 eq) was added, and an amidite reagent (0.307 ml, 1.38 mmol, 2 eq) was added gradually with agitation. This was removed from the glove bag and agitated for 30 minutes, and then dissolved in chloroform and washed with saturated sodium bicarbonate aqueous solution and saturated saline, and the organic layer was dried with anhydrous sodium sulfate. The solvent was distilled off under reduced pressure, and Compound (4) (0.539 g, 0.615 mmol, 89.3%) was isolated and purified by silica gel chromatography (ethyl acetate:acetone=2:1).

$^{31}$PNMR (400 MHz, $CDCl_3$) δ [ppm]: 149.25 ppm

Test Example 7

Synthesis of Oligonucleotides

Figure 8:
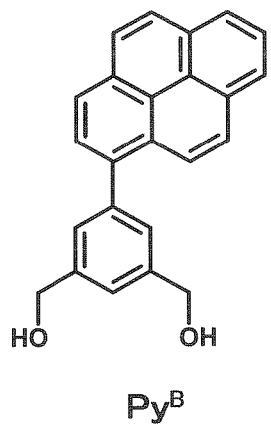
FIG. 8 shows the sequence of the oligonucleotide synthesized in Example 7.

Amidites corresponding to the bases of the oligonucleotides shown in FIG. 8 were prepared by ordinary methods, and oligonucleotide derivatives with the following sequences were synthesized by solid-phase synthesis methods. The molecular weights were confirmed by MALDI-TOF/MS (FIG. 9).

Test Example 8

Figure 10:
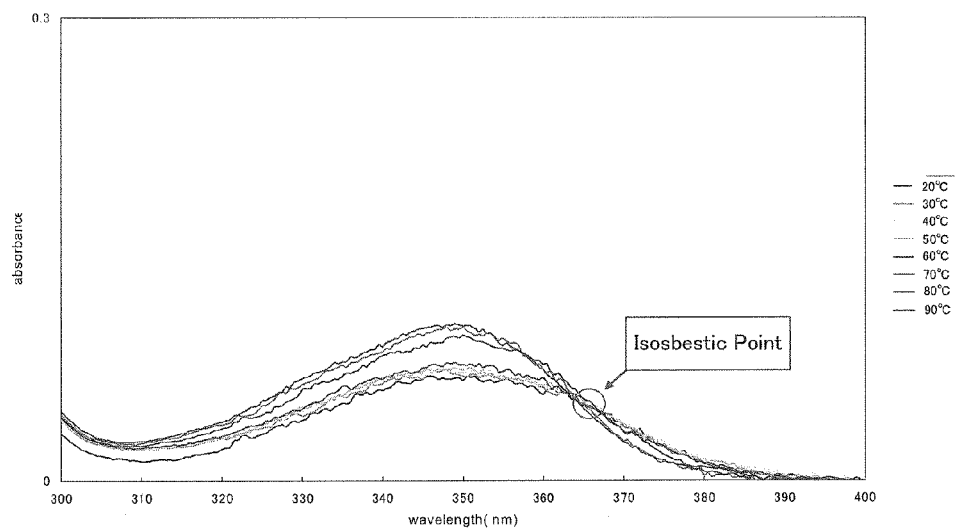
FIG. 10 shows the absorption spectra at different temperatures of an oligonucleotide derivative having one pyrene analog in each strand.
Figure 11:
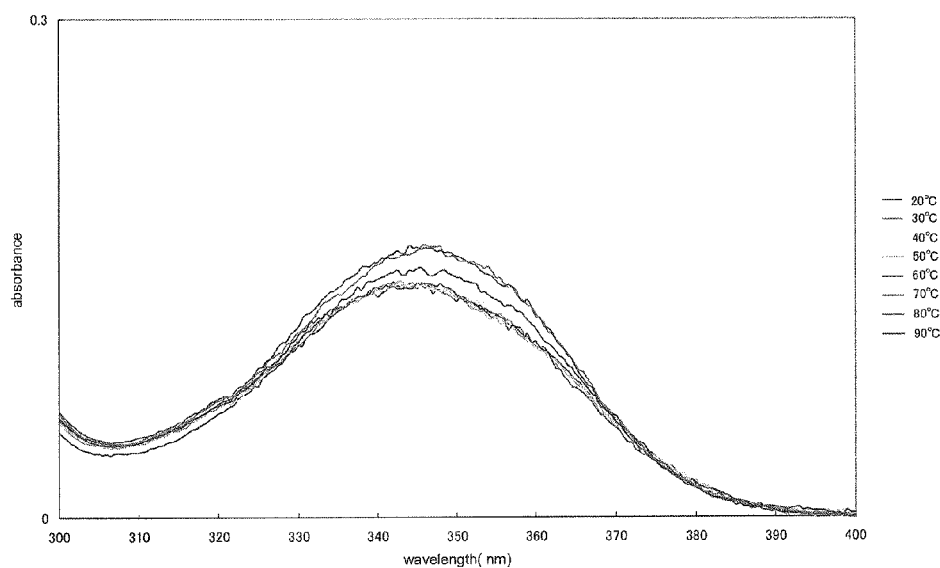
FIG. 11 shows the absorption spectra at different temperatures of an oligonucleotide derivative having two pyrene analogs in each strand.
Figure 12:
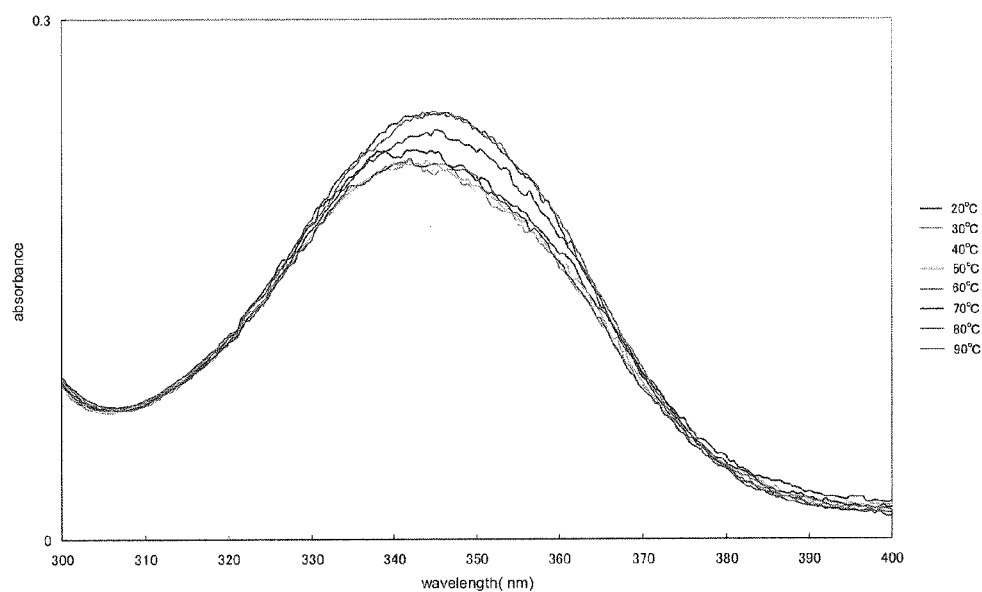
FIG. 12 shows the absorption spectra at different temperatures of an oligonucleotide derivative having three pyrene analogs in each strand.
Figure 13:
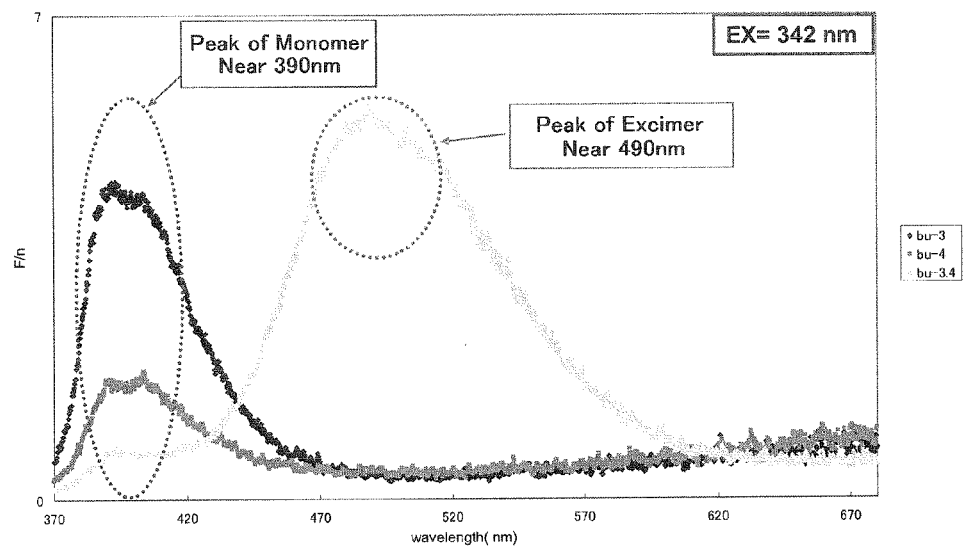
FIG. 13 shows the absorption spectra of the single-stranded and double-stranded forms of an oligonucleotide derivative having one pyrene analog in each strand.
Figure 14:
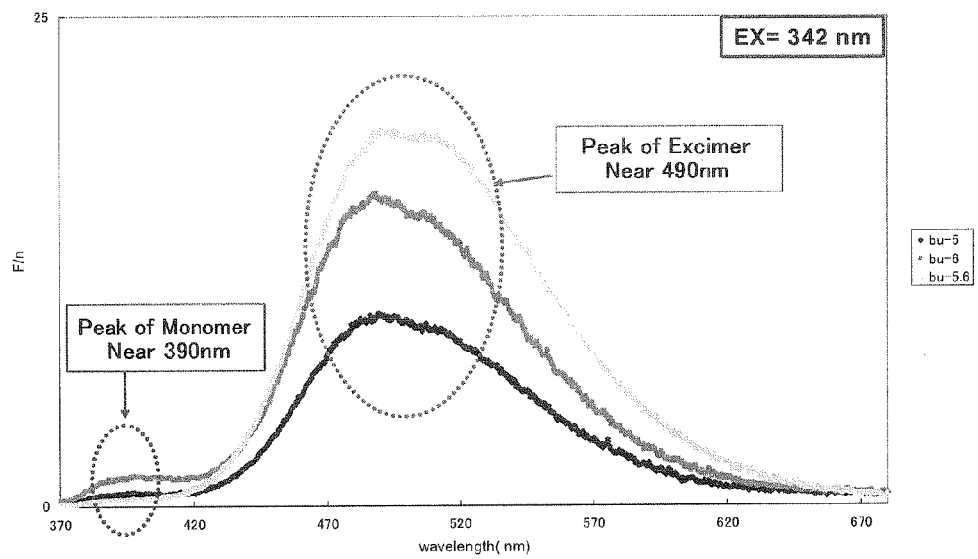
FIG. 14 shows the absorption spectra of the single-stranded and double-stranded forms of an oligonucleotide derivative having two pyrene analogs in each strand.
Figure 15:
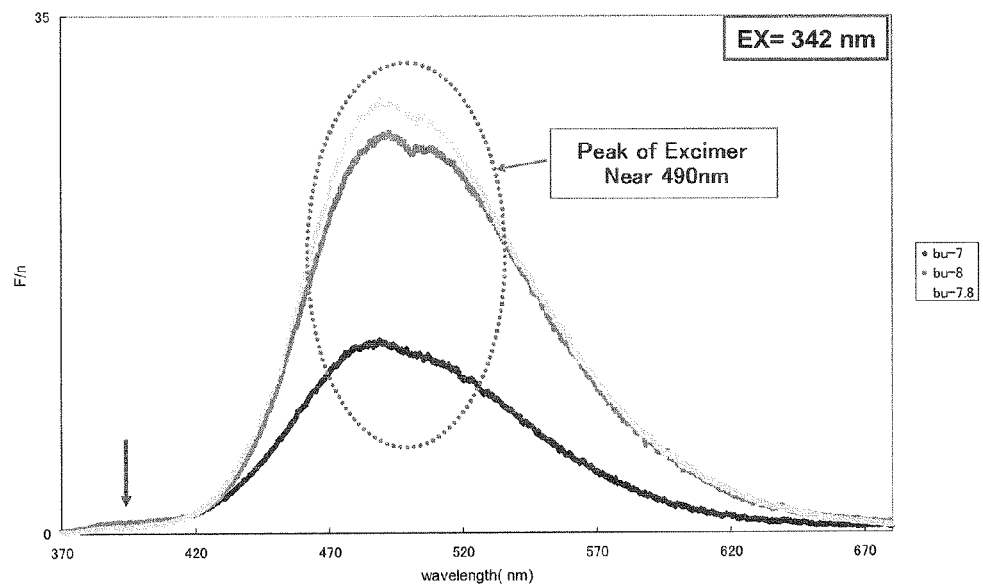
FIG. 15 shows the absorption spectra of the single-stranded and double-stranded forms of an oligonucleotide derivative having three pyrene analogs in each strand.
Figure 16:
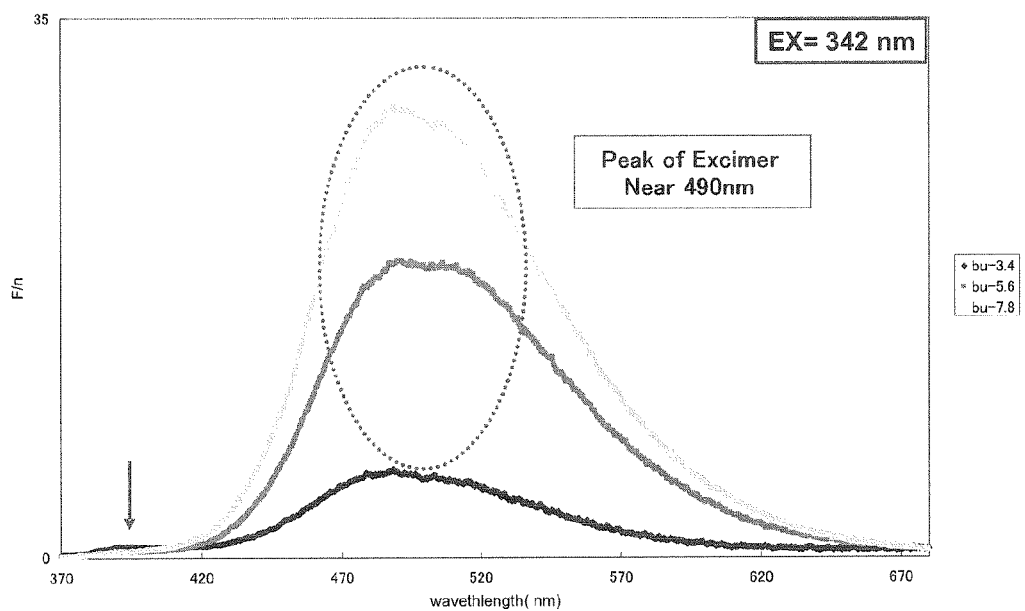
FIG. 16 is a graph comparing the fluorescence spectra of each double-stranded form.

Measurement of Absorption Spectrum, Fluorescence Spectrum and Melting Temperature The absorption spectra of these oligonucleotides were measured at the temperatures shown in FIG. 10 to FIG. 12 using 10 mM Tris-HCl (pH=7.2) and 100 mM NaCl buffers. The fluorescence spectra were measured at room temperature. The melting temperatures and/or single strand states were also measured. The excitation wavelength was 342 nm. The results are shown in FIG. 10 to FIG. 17.

As shown in FIG. 10 to FIG. 12, given 340 nm as the inherent absorption of pyrene, the spectra confirm that the pyrenes stack at low temperatures, while as the temperature rises the double strand dissociates, and UV absorption tends to increase. As shown in FIG. 13 to FIG. 16, moreover, the characteristic fluorescence of the excimer is observed most strongly in the double-stranded state when it is exposed to excitation light. However, fluorescence from the excimer was also observed with the single strand due to the stacking effect. These figures also show that fluorescence (390 nm) thought to derive from the analog monomer no longer appears when at least two or more pyrene analogs are stacked.

Figure 17:
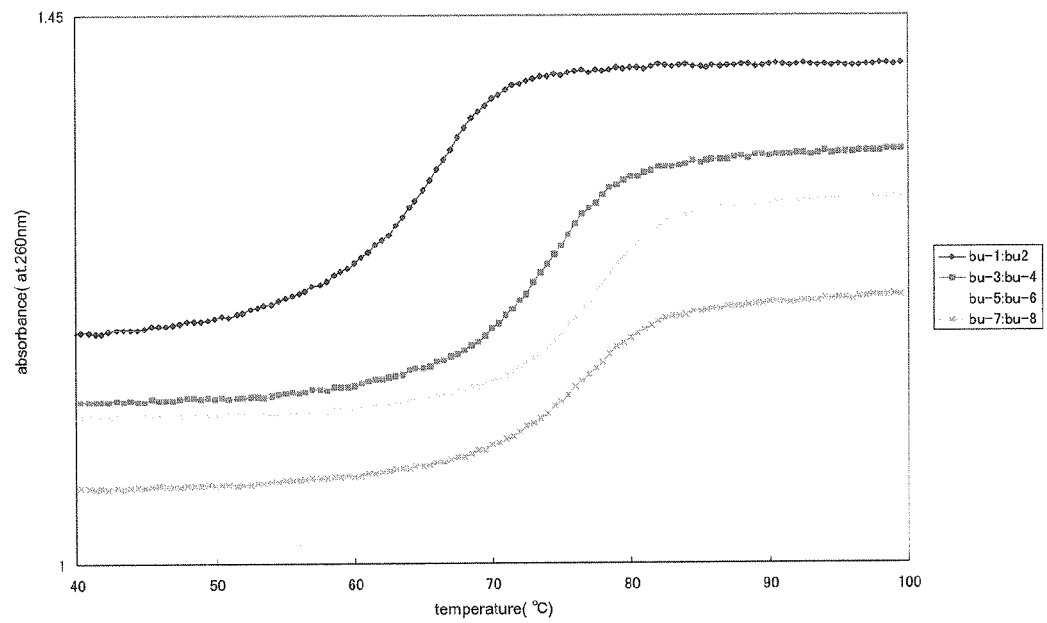
FIG. 17 shows a graph and table of the melting temperatures of each double strand.

As shown in FIG. 17, while the Tm of the natural double strand is about 64° C., that of D1 was 73° C., that of D2 was 77° C. and that of D3 was 76° C. Even though the number of hydrogen bonds contributing to the stability of the double strand is reduced by introduction of the pyrene analog, thermal stability is actually improved.

These results show that stacks of pyrene analogs are efficiently formed and are stable in these oligonucleotides.

Example 9

Synthesis of Perylene Analog

Synthesis of 3-bromoperylene (1)

Figure 18:
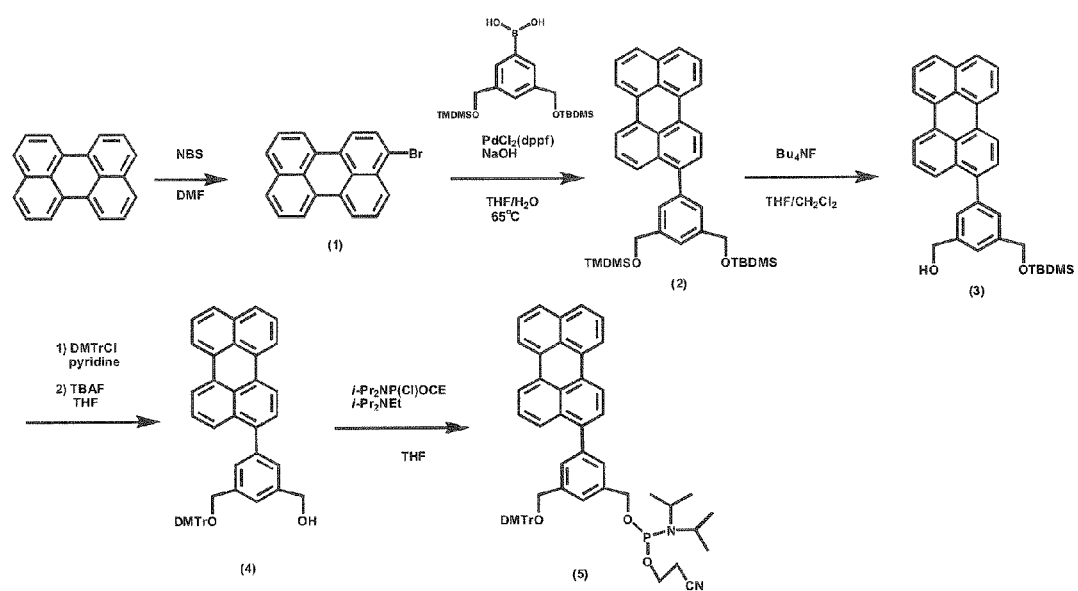
FIG. 18 shows the synthesis scheme of the perylene analog synthesized in Example 9.

Following the scheme shown in FIG. 18, perylene (252 mg, 1 mmol) was dissolved in DMF (45 ml), and a solution of NBS (178 mg) dissolved in DMF (10 ml) was added gradually. This was agitated at room temperature for 24 hours. $H_2O$ (200 ml) was added, and the product was precipitated and suction filtered. The product was recrystallized with hexane to obtain yellow-brown compound (1) (187 mg, mixture).

Synthesis of 3-(3,5-bis-tert-butyldimethylsilyloxymethylphenyl)perylene (2)

$PdCl_2$ (dppf, 17.4 mg, 5 mol %) was added to 3-bromoperylene (0.150 g, 0.453 mmol, 1.3 eq) in a darkroom. 3,5-bis-tert-butyldimethylsilyloxymethyl phenylboronic acid (0.143 g, 0.348 mmol, 1 eq) dissolved in THF/$H_2O$ (5:1, 3.6 ml) was added. 3.66 ml (3 eq) of 2N NaOH aq was injected, and the reaction was initiated in a 65° C. oil bath with light shielding, followed by 30 hours of agitation. The reaction was confirmed by TLC (Hex:EtOAc=5:1). This was neutralized with $NH_4Cl$ aq, and Celite filtered. After extraction with EtOAc, the organic layer was washed with $H_2O$, sat. $NaHCO_3$ aq and sat. NaCl aq, and dried by addition of anhydrous $Na_2SO_4$. The solvent was distilled off under reduced pressure to obtain the target product as a mixture with 3-bromoperylene (0.192 g).

Synthesis of 3-(3-hydroxymethyl-5-tert-butyldimethylsilyloxymethylphenyl)perylene (3)

A mixture of the previously vacuum-dried compounds (1), (2) and (3) (237 g) was dissolved in THF (38.5 ml) and dichloromethane (38.5 ml), and TBAF (2 ml, 2 mmol) was dripped in. The progress of the reaction was observed closely minute by minute by TLC (chloroform:methanol=1:1), and the reaction was stopped after 3 and a half hours. This was extracted with chloroform, and the organic layer was washed with saturated saline and dried by addition of anhydrous sodium sulfate. The solvent was distilled off under reduced pressure, and the residue was purified by silica gel column chromatography (hexane:ethyl acetate=10:1 to 1:1) to obtain Compound (3) (0.447 g, 0.889 mmol, 11%) as a red solid.

$^1$H NMR (400 MHz) (CDCl$_3$) δ: 8.09-7.12 (14H, m, aromatic protons), 4.72-4.66 (4H, m, CH$_2$), 0.81 (9H, s, t-butyl), 0.0079 (6H, s, TBDMS)

Synthesis of 3-(3-hydroxymethyl-5-(4,4'-dimethoxytrityloxy)methylphenyl)perylene (4)

Pyridine (8.2 ml) was added to dissolve Compound (3) (0.411 g, 0.818 mmol), and DMTrCl (0.556 g, 1.65 mmol, 2 eq) was added in an Ar atmosphere, and agitated for 18 hours at room temperature. Elimination of the raw materials was confirmed by TLC, and the sample was fractioned with chloroform and water. The organic layer was washed with saturated sodium bicarbonate aqueous solution and saturated saline, and dried with anhydrous sodium sulfate. The solvent was distilled off under reduced pressure, the pyridine was removed by toluene azeotropy, and the next reaction was performed. The concentrated product was dissolved in TI-IF (8.2 ml), TBAF (1.64 ml, 1.64 mmol, 2 eq) was added in an Ar atmosphere and agitated for 5 hours at room temperature, and completion of the reaction was confirmed by TLC. This was fractioned with chloroform and water and the organic layer was washed with saturated NaHCO$_3$ solution and saturated saline. The organic layer was dried with anhydrous sodium sulfate, the solvent was distilled off under reduced pressure, and Compound (4) was obtained by silica gel column chromatography (hexane:ethyl acetate=5:1 to 1:1) in the TBAF residue. This mixture was recrystallized (chloroform and n-hexane) to obtain Compound (4) (0.410 g, 0.593 mmol, 72% (2 steps)) as a yellow solid.

$^1$H NMR (400 MHz) (CDCl$_3$) δ: 8.25-6.83 (27H, m, aromatic protons), 4.80 (2H, d, J=6.1 Hz, CH$_2$), 4.29 (2H, s, CH$_2$O-DMTr), 3.78 (6H, s, OCH$_3$), 1.72 (1H, t, J=6.0 Hz, OH)

Synthesis of 3-3-(4,4'-dimethoxytrityloxy)methyl-5-0-{(2-cyanoethyl)-(N,N-diisopropyl)}-phosphoamidicmethylphenyl)perylene (5)

Compound (4) (0.406 g, 0.588 mmol) was dried thoroughly together with the test equipment, THF (3 ml) was added in argon using an Ar-substituted glove bag, and a phosphitylation reagent (0.263 ml, 1.18 mmol, 2.0 eq) was added in the presence of Hunig's Base (0.514 ml, 2.94 mmol, 5.0 eq), and agitated at room temperature for 1 hour. The reaction was confirmed by TLC (ethyl acetate:acetone=20:1) and stopped by addition of a small quantity of saturated NaHCO$_3$ aqueous solution, and the sample was fractioned with chloroform. The organic layer was washed with saturated saline, the solvent was distilled off under reduced pressure, and the residue was isolated and purified by neutral silica gel column chromatography (chloroform:acetone=30:1) to obtain yellow, bubbly Compound (5) (0.348 g, 0.391 mmol, 66%). Introduction of phosphorous acid groups was confirmed by $^{31}$PNMR.

Test Example 10

Synthesis of Oligonucleotide Derivatives

Figure 19:
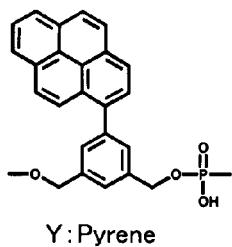
FIG. 19 shows the sequences and structures of the oligonucleotide derivatives synthesized in Example 10.
Figure 19:
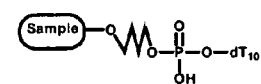
Figure 19:
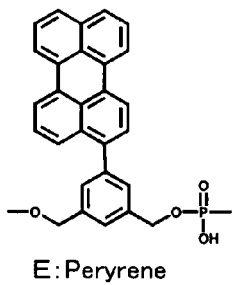
Figure 19:
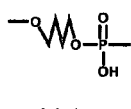
Figure 20:
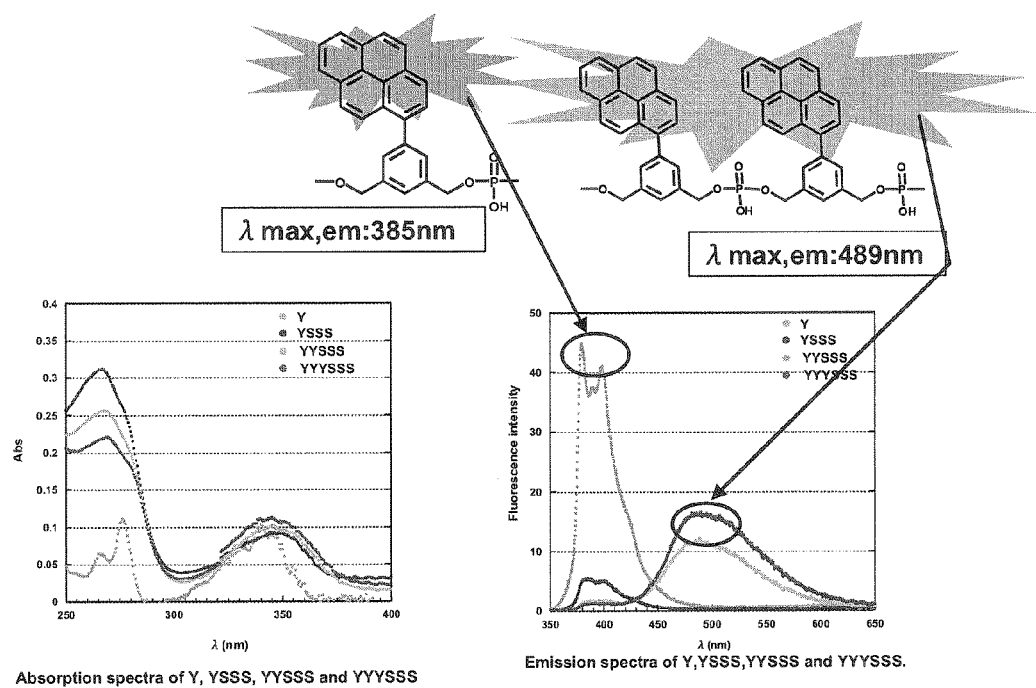
FIG. 20 shows the absorption spectra and fluorescence spectra of oligonucleotide derivatives synthesized in Example 10.
Figure 21:
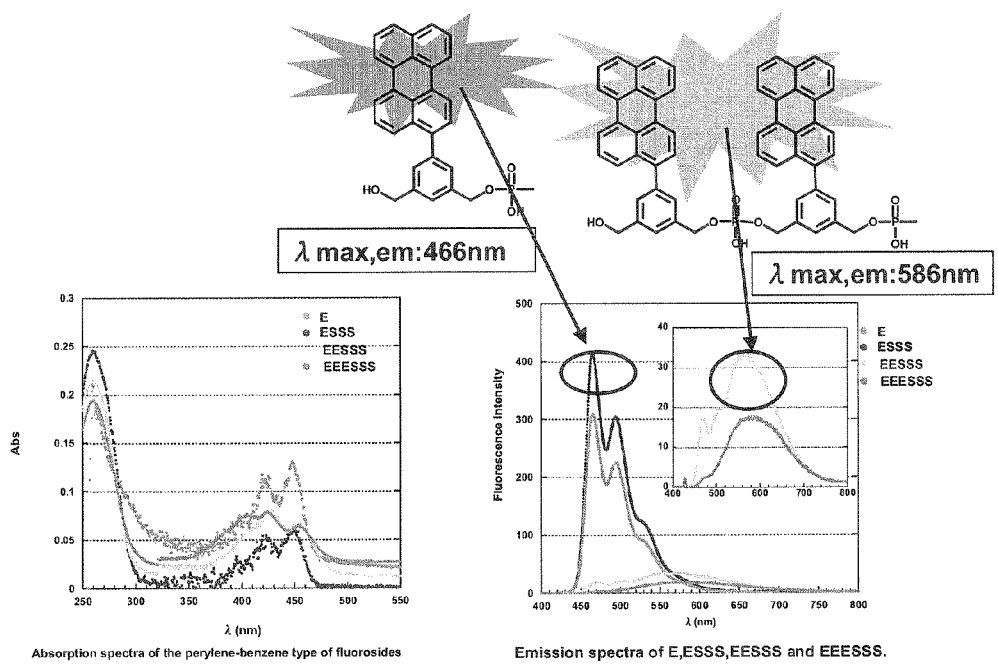
FIG. 21 shows the absorption spectra and fluorescence spectra of oligonucleotide derivatives synthesized in Example 10.
Figure 22:
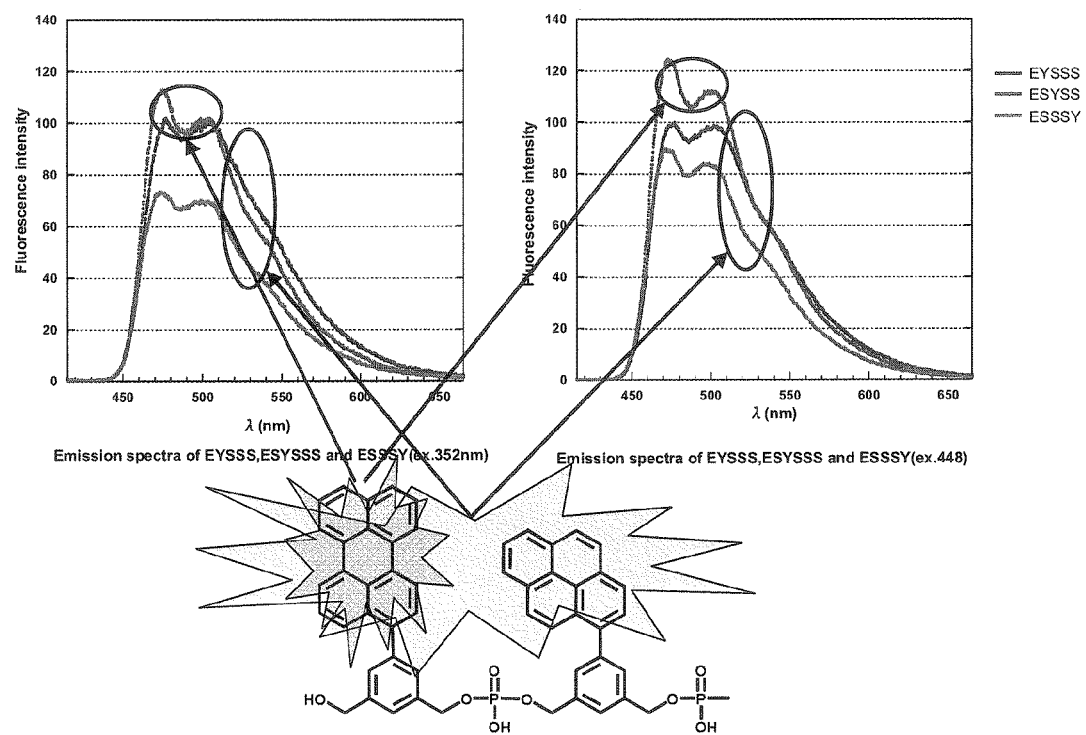
FIG. 22 shows the absorption spectra and fluorescence spectra of oligonucleotide derivatives synthesized in Example 10.
Figure 23:
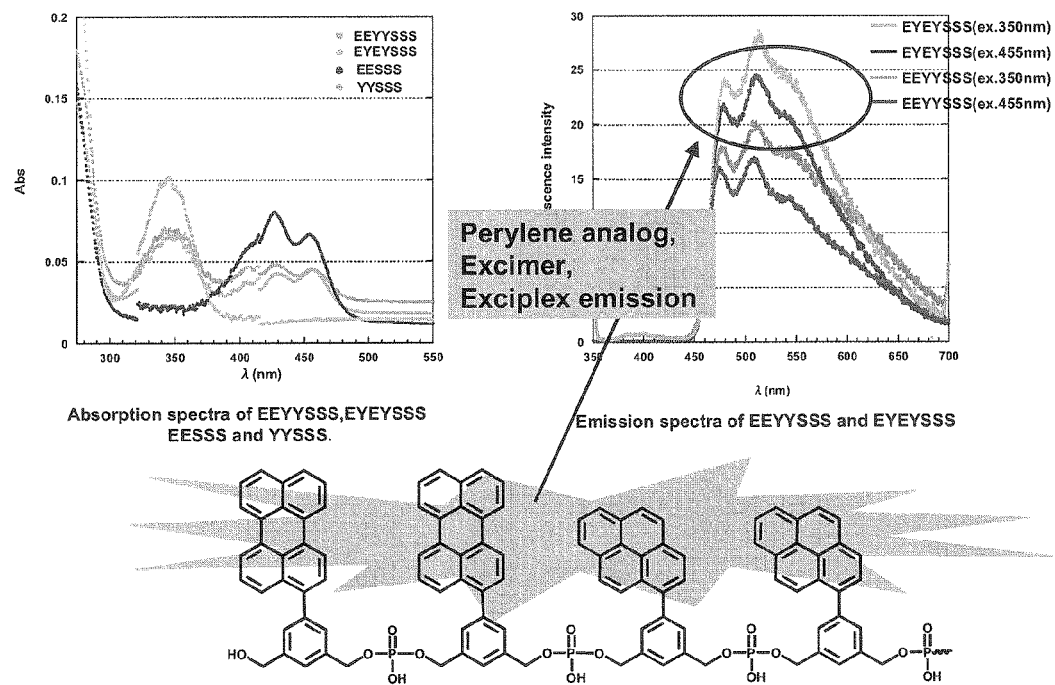
FIG. 23 shows the absorption spectra and fluorescence spectra of oligonucleotide derivatives synthesized in Example 10.

Using the pyrene analog amidite already synthesized in Example 6 and the perylene analog amidite synthesized in Example 9, as well as the linker (S) shown in FIG. 19, oligonucleotides were synthesized having a labeling agent with the sequence shown in the same FIG. 19 at the 5' end of poly T (10 thymidine deoxyribonucleotides). The linker amidite was synthesized by a dimethoxytritylation of one of the hydroxyl groups of butanediol, and a following phosphitylation of the other hydroxyl group. The oligonucleotide derivatives obtained in this test example correspond to the oligonucleotide derivative disclosed in the Specification.

Test Example 11

Measurement of Absorption Spectra and Fluorescence Spectra of Oligonucleotide

The absorption spectra and fluorescence spectra of the 11 oligonucleotides synthesized in Test Example 10 were measured. The results are shown in FIGS. 20 to 23. A wavelength near the 350 nm excitation wavelength of pyrene and a wavelength near the 455 nm excitation wavelength of perylene were used for measuring the fluorescence spectra.

Figure 24:
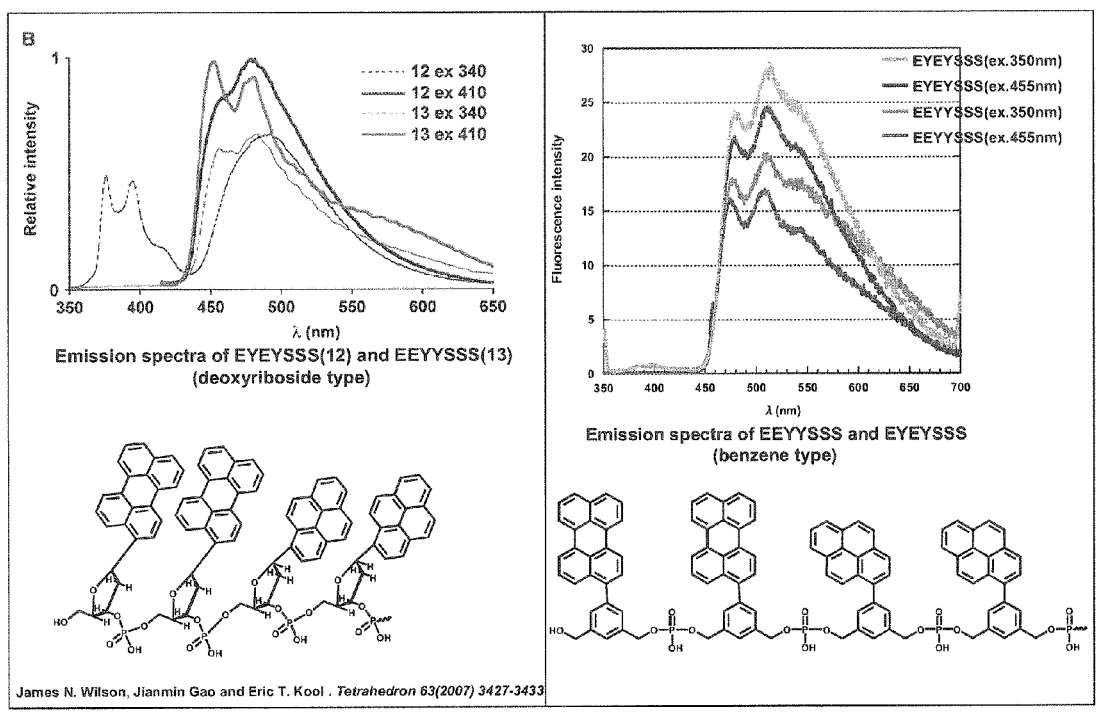
FIG. 24 is a graph comparing the results of Example 11 with the results of Non-patent Document 1.

The stacking effect of an oligonucleotide containing a pyrene analog and/or perylene analog is shown clearly in FIGS. 20 to 23. As shown in FIG. 24, moreover, when compared with the results of Non-patent Document 1, the oligonucleotide derivative disclosed in the Specification had the fluorescence wavelength shifted towards a longer wavelength, while expression of the fluorescence spectrum of the monomers was suppressed by stacking.

Figure 25:
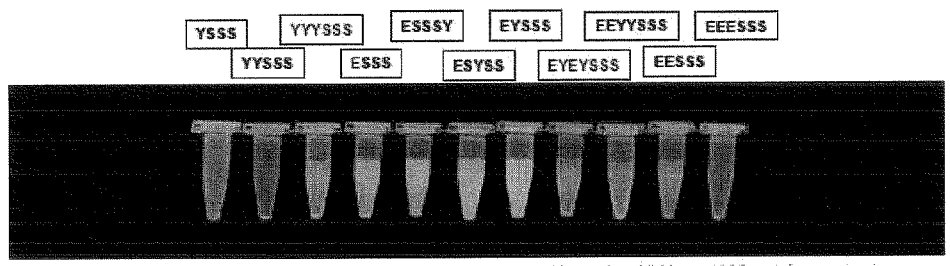
FIG. 25 shows the results of irradiating an aqueous solution of the oligonucleotide synthesized in Test Example 10 with light at a wavelength of 365 nm.

FIG. 25 shows the results when aqueous solutions of the oligonucleotide derivatives synthesized in Test Example 10 were exposed to light at a wavelength of 365 nm. As shown in FIG. 25, a total of 11 colors appeared from the center left to right of the figure, ranging from purple to blue, green, yellow and red, Example 12

Figure 26:
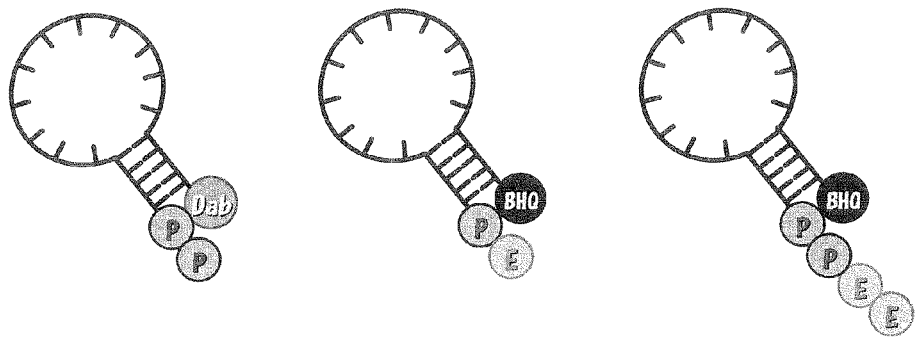
FIG. 26 shows the quenching-emission of a molecular beacon probe.
Figure 26:
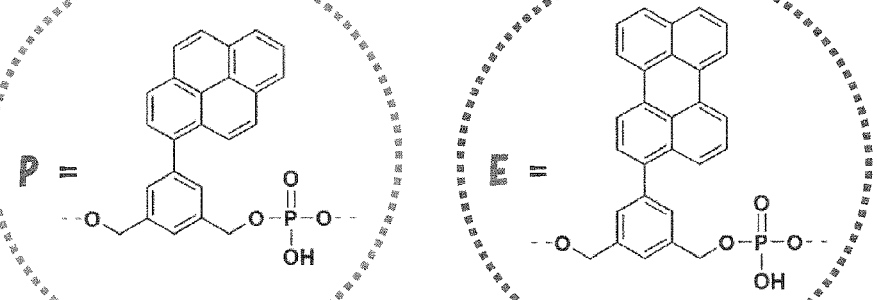
Figure 26:
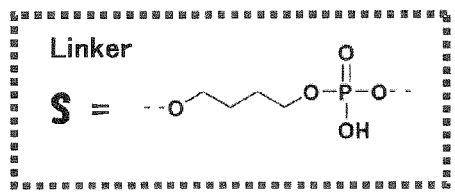

In this example, molecular beacons were prepared according to the examples above each with a specific sequence having BHQ or Dab at the 3' terminal as a quencher, and having a nucleotide derivative disclosed in the Specification with pyrene analogs and perylene analogs as substituents Y attached to the 5' terminal via a linker (see FIG. 26). These molecular beacons were hybridized with target RNA1 having one mismatched base and target RNA2 having a perfectly matched sequence, and quenching and illumination were observed. The concentration of the molecular beacon was 3 μM (Na-phosphoric acid buffer pH 7.0, 100 mM NaCl), and excitation was observed with UV (wavelength 365 nm). The results are shown in FIG. 26.

As shown in FIG. 26, the fluorescence tended to shift towards longer wavelengths as the number of nucleotide derivative units increased. Stronger fluorescence was also observed during hybridization with the perfectly matched RNA than with the mismatched RNA. It was confirmed that the nucleotide derivative unit disclosed in the Specification is effectively quenched with a quencher, and that fluorescence is reliably obtained during hybridization with a target nucleic acid.

Example 13

In this example, various kinds of siRNA were synthesized having the nucleotide derivative unit (Y being naphthalene) disclosed in the Specification at a terminal (see FIG. 27), and the protein expression suppressing effect was confirmed. That is, in this example a Luc Assay at concentrations of 0.1, 0.5, 1, 5, and 10 nM was performed to evaluate the protein expression-suppressing effects of synthesized Renilla siRNA with the 3' terminal chemically modified (evaluation of protein expression-suppressing effect of 3' terminal-modified siRNA by Dual Luciferase Assay). The operations were as follows.

(Luc Assay)

HeLa cells were prepared to 4000 cells/mL, and each well of a 96-well plate was filled with 100 μL and incubated for 24 hours. Each of the strands of the synthesized siRNA was dissolved in TE buffer (100 mM NaCl), overheated for 3 minutes at 95° C., and left for 1 hour to return to room temperature. Each amount of the siRNA, each amount of medium (OPTI-MEM), 1 μL of 0.2 μg/μL psi-CHECK (Firefly, vector having the respective Renilla sequence) and 3 μL of transfast (transfection reagent) were mixed to a total quantity of 350 μL, 35 μL was added to each well of a 96-well plate with the medium sucked out, and after 1 hour 100 μL of medium was added and incubated for 24 hours. 100 μL of lysis buffer was added to each well and shaken. 24 μL of the sample was transferred to a 96-well plate for emission measurement, 24 μL of Dual glo substrate (Firefly substrate) was added and left for 10 minutes, and Firefly luciferase was measured. 24 μL of Stop and glo substrate was then added and left for 10 minutes, and Renilla luciferase was measured. The Renilla luciferase value was divided by the Firefly luciferase value, and compared using % of control. Luminescenser JNRII was used for luciferase measurement. 100% was given as the value of a control having no transfected siRNA. The results are shown in FIG. 27.

As shown in FIG. 27, the results of the Dual Luciferase Assay show that all of the siRNA synthesized here exhibited more activity at a low concentration than normal type siRNA (dTdT in FIG. 27). Of these, a particularly good siRNA effect was shown by the BN type (siRNA having one 13 unit and one N unit at the 3' terminus of the guide strand and one N unit at the 5' terminus and two B units at the 3' terminus of the passenger strand). This is thought to reflect the nuclease resistance of siRNA of the BN type and NN type.

The invention claimed is:

1. A labeling agent comprising a plurality of nucleotide derivative units represented by Formula (1) below:

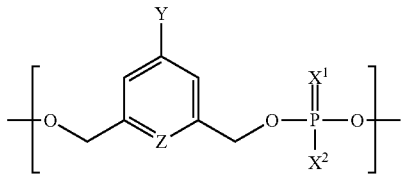

(1)

(where, Z represents a nitrogen atom or CH, Y represents an uncondensed aromatic hydrocarbon group or condensed polycyclic hydrocarbon group other than naturally occurring base having purine structure or pyrimidine structure, $X^1$ represents O, S or Se, and $X^2$ represents SH (or $S^-$), $Se^-$, or a $C_{1-4}$ alkyl group or morpholino group).

2. The labeling agent according to claim 1, wherein said Y is a condensed polycyclic hydrocarbon group.

3. The labeling agent according to claim 2, wherein said Y is selected from a group consisting of naphthalene, phenathrene, pyrene and perylene.

4. The labeling agent according to claim 1, comprising a plurality of said nucleotide derivative units in a continuous series.

5. The labeling agent according to claim 1, comprising a plurality of said nucleotide derivative units, with linker units in between.

6. The labeling agent according to claim 1, wherein said multiple nucleotide units are two nucleotide derivative units in which said Y is the same or different, and are provided in a continuous series.

7. A set of labeling agents comprising two or more labeling agents each provided with a plurality of nucleotide derivative units represented by Formula (1) below:

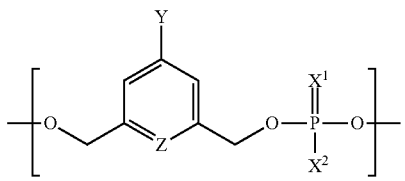

(1)

(where, Z represents a nitrogen atom or CH, Y represents an uncondensed aromatic hydrocarbon group or condensed polycyclic hydrocarbon group other than naturally occurring base having purine structure or pyrimidine structure, $X^1$ represents O, S or Se, and $X^2$ represents SH (or $S^-$), $Se^-$, or a $C_{1-4}$ alkyl group or morpholino group), wherein the sequence of said Y in said plurality of nucleotide derivative units is different for each of the labeling agents.

8. The set of labeling agents according to claim 7, further comprising a labeling agent provided with one of the nucleotide derivative units represented by Formula (1) above.

9. An oligonucleotide probe comprising a plurality of nucleotide derivative units represented by Formula (1) below:

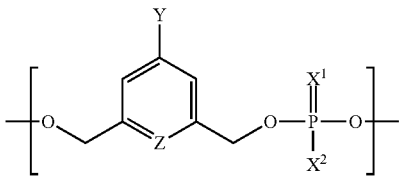

(1)

(where, Z represents a nitrogen atom or CH, Y represents an uncondensed aromatic hydrocarbon group or condensed polycyclic hydrocarbon group other than naturally occurring base having purine structure or pyrimidine structure, $X^1$ represents O, S or Se, and $X^2$ represents SH (or $S^-$), $Se^-$, or a $C_{1-4}$ alkyl group or morpholino group).

10. The oligonucleotide probe according to claim 9, comprising said plurality of nucleotide derivative units at the 3' terminal end or 5' terminal end.

11. An oligonucleotide probe set comprising two or more oligonucleotide probes each provided with a plurality of nucleotide derivative units represented by Formula (1) below:

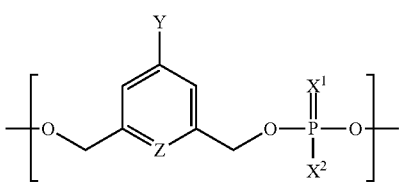

(1)

(where, Z represents a nitrogen atom or CH, Y represents an uncondensed aromatic hydrocarbon group or condensed polycyclic hydrocarbon group other than naturally occurring base having purine structure or pyrimidine structure, $X^1$ represents O, S or Se, and $X^2$ represents SH (or $S^-$), $Se^-$ or a $C_{1-4}$ alkyl group or morpholino group), wherein the sequence of said Y in said plurality of nucleotide derivative units is different for each of the probes.

12. The oligonucleotide probe set according to claim 11, further comprising a labeling agent provided with one of the nucleotide derivative units represented by Formula (1).

* * * * *